(12) United States Patent
Shattil

(10) Patent No.: US 11,640,522 B2
(45) Date of Patent: May 2, 2023

(54) COMPUTATIONAL EFFICIENCY IMPROVEMENTS FOR ARTIFICIAL NEURAL NETWORKS

(71) Applicant: Genghiscomm Holdings, LLC, Boulder, CO (US)

(72) Inventor: Steve Shattil, Cheyenne, WY (US)

(73) Assignee: Tybalt, LLC, Boulder, CO (US)

( * ) Notice: Subject to any disclaimer, the term of this patent is extended or adjusted under 35 U.S.C. 154(b) by 693 days.

(21) Appl. No.: 16/712,954

(22) Filed: Dec. 12, 2019

(65) Prior Publication Data
US 2020/0364545 A1    Nov. 19, 2020

Related U.S. Application Data

(60) Provisional application No. 62/778,894, filed on Dec. 13, 2018.

(51) Int. Cl.
*G06N 3/08*    (2006.01)
*G06N 3/04*    (2006.01)
(Continued)

(52) U.S. Cl.
CPC ............. *G06N 3/063* (2013.01); *G06F 17/16* (2013.01); *G06N 3/04* (2013.01); *G06N 3/08* (2013.01)

(58) Field of Classification Search
None
See application file for complete search history.

(56) References Cited

U.S. PATENT DOCUMENTS 6,340,964 B1 * 1/2002 Nakazawa ........... G09G 3/3625
                                                                345/100
9,147,154 B2    9/2015 Wang et al.
(Continued)

FOREIGN PATENT DOCUMENTS

CN           110050256        7/2019
KR    10-2018-0096474      8/2018
(Continued)

OTHER PUBLICATIONS

International Search Report, PCT application PCT/US2020/045773, dated Nov. 25, 2020.
(Continued)

*Primary Examiner* — Joni Hsu
(74) *Attorney, Agent, or Firm* — Steven J Shattil

(57) ABSTRACT

An artificial neural network (ANN) generates a base expanded matrix that represents an output of a layer of the ANN, such as the output layer. Values in each row are grouped with respect to a set of network parameters in a previous layer, and a sum of the values in each row produces an output vector of activations. The ANN updates the values in at least one column of the expanded matrix according to parameter updates, which results in an updated expanded matrix or an update expanded matrix. An error or a total cost can be computed from the updated expanded matrix or the update expanded matrix. Nonlinear activation functions can be modeled as piecewise linear functions, and a change in an activation function's slope can be modeled as a linear update to an expanded matrix. Parameter updates can be constrained to a restricted value set in order to simplify update operations performed on the expanded matrices.

24 Claims, 9 Drawing Sheets

(51) Int. Cl.
*G06F 17/16* (2006.01)
*G06N 3/063* (2023.01)

(56) References Cited

U.S. PATENT DOCUMENTS

| | | | |
|---|---|---|---|
| 9,449,271 | B2 | 9/2016 | Wang et al. |
| 10,068,170 | B2 | 9/2018 | Golovashkin et al. |
| 10,140,980 | B2 | 11/2018 | Bengio et al. |
| 10,325,181 | B2 | 6/2019 | Xu et al. |
| 10,475,165 | B2 | 11/2019 | Vogels et al. |
| 10,482,337 | B2 | 11/2019 | Balasubramanian et al. |
| 10,490,182 | B1 | 11/2019 | Madhavaraj et al. |
| 10,521,717 | B2 | 12/2019 | Lee |
| 10,529,320 | B2 | 1/2020 | Shafran et al. |
| 10,558,909 | B2 | 2/2020 | Droppo et al. |
| 11,151,445 | B2 * | 10/2021 | Fowers ............... G06N 3/063 |
| 2002/0087221 | A1 | 7/2002 | Keeler et al. |
| 2003/0144974 | A1 | 7/2003 | Chang et al. |
| 2003/0154175 | A1 | 8/2003 | Shi et al. |
| 2003/0233335 | A1 | 12/2003 | Mims |
| 2004/0019575 | A1 | 1/2004 | Talbot et al. |
| 2004/0088406 | A1 | 5/2004 | Corley et al. |
| 2005/0065900 | A1 | 3/2005 | Masato et al. |
| 2008/0319933 | A1 | 12/2008 | Moussa et al. |
| 2011/0191274 | A1 | 8/2011 | Yu et al. |
| 2011/0307424 | A1 * | 12/2011 | Jin .................... G06N 20/00 706/12 |
| 2013/0138436 | A1 | 5/2013 | Yu et al. |
| 2013/0138589 | A1 | 5/2013 | Yu et al. |
| 2013/0304683 | A1 * | 11/2013 | Lo .................... G06N 3/049 706/20 |
| 2015/0269485 | A1 | 9/2015 | Julian et al. |
| 2016/0026914 | A1 | 1/2016 | Yu et al. |
| 2016/0034810 | A1 * | 2/2016 | Hershey ............ G06N 3/0436 706/22 |
| 2016/0307072 | A1 | 10/2016 | Zhou et al. |
| 2017/0228646 | A1 * | 8/2017 | O'Connor ........... G06F 11/079 |
| 2018/0005115 | A1 | 1/2018 | Gokmen et al. |
| 2018/0109557 | A1 | 4/2018 | Yoo et al. |
| 2018/0268289 | A1 | 9/2018 | Wong |
| 2018/0324595 | A1 | 11/2018 | Shima |
| 2019/0171539 | A1 | 6/2019 | Pillay et al. |
| 2019/0236445 | A1 | 8/2019 | Das et al. |
| 2019/0244104 | A1 | 8/2019 | Cai et al. |
| 2019/0258934 | A1 | 8/2019 | Sorokin |
| 2019/0303743 | A1 | 10/2019 | Venkataramani et al. |
| 2019/0392297 | A1 * | 12/2019 | Lau .................... G06N 3/0454 |

FOREIGN PATENT DOCUMENTS

| | | |
|---|---|---|
| WO | 2017214507 | 12/2017 |
| WO | 2019006088 | 3/2019 |

OTHER PUBLICATIONS

Written Opinion of the International Searching Authority, PCT application PCT/US2020/045773, dated Nov. 25, 2020.

J. Cai, et al.; "Deep Convolutional Neural Network Based Antenna Selection in Multiple-Input Multiple-Output System"; https://doi.org/10.1371/journal.pone.0215672; May 1, 2019.

H. He, et al.; "Deep Learning-based Channel Estimation for Beamspace mmWave Massive MIMO Systems"; IEEE Wireless Communications Letters, vol. 7, Issue: 5, Oct. 2018.

H. Ye, et al.; "Power of Deep Learning for Channel Estimation and Signal Detection in OFDM Systems"; IEEE Wireless Communications Letters, Year: 2018 | vol. 7, Issue: 1; Sep. 28, 2017.

B. Makki, et al.; "A Genetic Algorithm-based Antenna Selection Approach for Large-but-Finite MIMO Networks"; IEEE Transactions on Vehicular Technology, vol. 66, Issue: 7, Jul. 2017.

T-W Ban and B.C. Jung; "A Practical Antenna Selection Technique in Multiuser Massive MIMO Networks"; IEICE Transactions on Communications E96.B(11):2901-2905—Nov. 2013.

A.M. Elbir, et al.; "Cognitive Radar Antenna Selection via Deep Learning"; IET Radar, Sonar & Navigation, vol. 13, Issue: 6, Jun. 10, 2019.

T.X. Vu, et al.; "Machine Learning based Antenna Selection and Power Allocation in Multi-user MISO Systems"; 2019 IEEE International Symposium on Modeling and Optimization in Mobile, Ad Hoc, and Wireless Networks, Jun. 2019.

F.M. Ferreira, et al.; "On the Performance of Digital Back Propagation in Spatial Multiplexing Systems"; Journal of Lightwave Technology PP(99):1-1—Feb. 2020.

E. Variani, et al. "Complex Linear Projection (CLP): A Discriminative Approach to Joint Feature Extraction and Acoustic Modeling"; Interspeech 2016, Sep. 8-12, 2016, San Francisco, USA.

R. Bunel, et al.; "A Unified View of Piecewise Linear Neural Network Verification"; arXiv:1711.00455 [cs.AI], May 22, 2018.

R. Bunel, et al.; "Branch and Bound for Piecewise Linear Neural Network Verification"; arXiv:1909.06588 [cs.LG], Sep. 14, 2019(v1).

Md.Z. Alom, et al.; "Deep Versus Wide Convolutional Neural Networks for Object Recognition on Neuromorphic System"; 2018 International Joint Conference on Neural Networks (IJCNN), Jul. 8-13, 2018.

H. Guo, et al.; "DeepFM: An End-to-End Wide & Deep Learning Framework for CTR Prediction"; Journal of Latex Class Files, vol. 14, No. 8, Aug. 2015.

J. Le, A.G. Ororbia; "From Matrix Factorization To Deep Neural Networks: The Evolution Of Collaborative Filtering Solutions for Recommendation Systems"; https://static1.squarespace.com/static/59d9b2749f8dce3ebe4e676d/t/5dfaa6e33b6e8710da687359/1576707817521/JamesLe-Independent-Study-Report-Recommendation-Systems.pdf, 2019.

* cited by examiner

COMPUTATIONAL EFFICIENCY IMPROVEMENTS FOR ARTIFICIAL NEURAL NETWORKS

CROSS REFERENCE TO PRIOR APPLICATIONS

This application claims the priority benefit of U.S. Patent Application Ser. No. 62/778,894, filed on Dec. 13, 2018.

BACKGROUND

I. Field

Aspects of this disclosure relate generally to artificial neural networks (ANNs), and more particularly, to computationally efficient processing in ANNs.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

Neural networks are comprised of multiple hidden layers, and each of the hidden layers has multiple hidden nodes which consist of an affine map of the outputs from the previous layer and a nonlinear map called an activation function. The nonlinear activation function makes neural networks differ from the linear models, that is, a neural network becomes a linear function if a linear activation function is used. The problem of training a feedforward neural network is to determine a number of adjustable parameters or connection weights based on a set of training data. A trained feedforward neural network can be regarded as a nonlinear mapping from the input space to the output space. However, neural networks are both computationally intensive and memory intensive, making them difficult to deploy on embedded systems with limited hardware resources and power budgets.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

One aspect employs disclosed techniques to select which weights and/or biases to update in a (e.g., supervised and/or unsupervised) learning process that trains an ANN. One aspect employs disclosed techniques to update weights and/or biases to update in a (e.g., supervised and/or unsupervised) learning process. One aspect employs disclosed techniques to adapt the network topology, such as by adding and/or deleting neurons, adding and/or deleting synapses, adding and/or deleting layers, adapting the functions performed in neurons, or any combination thereof. One aspect employs disclosed techniques for updating the network's output and/or cost function after an update to one or more weights and/or biases. Some aspects may be performed as part of a forward pass (e.g., forward propagation) or to replace a forward pass.

In one aspect, a set of inputs is provided to an ANN, and a forward pass is performed, wherein outputs from one layer are fed forward to one or more other layers. An ANN, or neural net, is a (nodal) network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data. In some aspects, each neuron (or node) produces a single output that is fed forward to neurons in the layer immediately following it. But each neuron in a hidden layer may receive multiple inputs, either from the input layer or from the outputs of neurons in an immediately preceding hidden layer. In general, each node may apply a function (e.g., an activation or transfer function) to its inputs to produce an output for that node. Nodes in hidden layers (e.g., learning layers) may apply the same function to their respective input(s) to produce their respective output(s). Nonlinear activation functions, pooling, aggregation, etc. can cause some information to be lost. Since information may be lost during the application of the neuron's function, a neuron or the function may preserve (or store) some information from its input. Some nodes, such as the nodes in the input layer, receive only one input and may be passive, meaning that they simply relay the values of their single input to their output(s), e.g., they provide a copy of their input to their output(s).

Before the neural net is trained, the weights may be individually assigned an initial (e.g., random and optionally non-zero) value. Various methods of assigning initial weights are known in the art. The weights are then trained (optimized) so that for a given training vector input, the neural network produces an output close to a desired (predetermined) training vector output. For example, the weights may be incrementally adjusted in thousands of iterative cycles by a technique termed back-propagation. In the forward pass of each cycle, a training input (e.g., vector input) may be fed forward through the neural network to determine its actual output (e.g., vector output). An error for each output neuron, or output node, is then calculated based on the actual neuron output and a target training output for that neuron. Then backpropagation may be performed through the neural network (in a direction from the output layer back to the input layer) to update the weights based on how much effect each weight has on the overall error, so that the output of the neural network moves closer to the desired training output. This cycle can be repeated until the actual output of the neural network is within an acceptable error range of the desired training output.

In one aspect, for example, the forward pass can be configured to effect matrix multiplications in place of elementwise vector products and/or matrix-vector products (such as, at each hidden layer, effectively converting any input vectors to matrices, converting weight vectors to matrices, performing matrix-matrix multiplication of the input and weight matrices, and outputting at each layer an expanded matrix of the corresponding layer output), so the output layer produces an expanded-matrix output, which can be summed to produce the vector output. An update to the expanded-matrix output can be performed based on the weight update(s), such as by updating a column(s) in the expanded-matrix output that corresponds to the weight update(s). The elements in each row of the resulting updated expanded-matrix output may be summed to produce an updated vector output, from which an updated error may be computed. The weights may be updated based on the updated error.

The following summary of disclosed aspects can be configured for implementation by methods, systems of processing elements operating as an ANN, individual processors in an ANN that are programmed to perform disclosed methods, computer software residing on non-transitory computer-readable memory, and electronic circuitry, for example.

In one aspect, an ANN generates a base expanded matrix having a plurality of rows and a plurality of columns, the base expanded matrix representing an output of a layer of the ANN, wherein a sum of values in each row produces a base output vector. The ANN can update values in at least one column of the base expanded matrix to produce an updated expanded matrix or an update expanded matrix. The ANN can compute at least one of an error and a total cost from the updated expanded matrix or the update expanded matrix. The error and/or total cost may be used to update parameters in the ANN, such as to reduce the error of the ANN's output, or prediction, such as may be measured from a labeled training data set.

The base expanded matrix can comprise parameters from one or more previous layers. The values in the base expanded matrix can be numerically computed from these parameters. At least one column of the base expanded matrix can be selected for update based on which parameter(s) in a previous layer of the ANN is (are) updated. The updated expanded matrix can be computed from at least one of an additive update or a multiplicative update to the base expanded matrix.

In one aspect, each column of the base expanded matrix comprises coefficients corresponding to one of a set of ANN parameters. In another aspect, each column of the base expanded matrix comprises products of the coefficients with the one of the set of ANN parameters.

Aspects can provide for numerically computing each value in the base expanded matrix, and the update expanded matrix or the updated expanded matrix can be computed by constraining one or more update values to a restricted set of values such that updates to each value in the base expanded matrix can comprise only one or more of shifting the base expanded matrix value's bits, changing the base expanded matrix value's sign bit, deleting the base expanded matrix value, and changing the base expanded matrix value's decimal point.

By way of example, shifting the bit pattern of a number to the right by 1 bit divides the number by 2. Similarly, shifting a number to the left by 1 bit multiplies the number by 2. A decimal left shift of an unsigned binary integer, I, by S digit positions corresponds to multiplying/by $10^S$. The following papers are hereby incorporate by reference in their entireties: S. Gonzalez-Navarro, et al., "A study of decimal left shifters for binary numbers", Information and Computation, Vol. 216, July 2012, pp. 47-56; H. Nikmehr, B. Phillips, C.-C. Lim; "Fast decimal floating-point division"; IEEE Trans. VLSI Systems, 14 (2006), pp. 951-961; and L.-K. Wang, M. J. Schulte; "A decimal floating-point divider using NewtonRaphson iteration"; J. VLSI Signal Process. (2007), pp. 727-739).

In some aspects, the ANN comprises multiple electronic synapses connecting multiple electronic neurons.

Some aspects can sum values in each row of the updated expanded matrix to produce an updated output vector.

In some disclosed aspects, parameter data structures from which the base expanded matrix is generated are configured to commute under multiplication.

In some aspects, the base expanded matrix comprises input data to the ANN received from at least one sensor.

In some aspects, updating of base expanded matrix is first performed with respect to an update to a parameter in a previous layer, followed by updating an activation function in a layer following the previous layer. A base expanded matrix may be a previous expanded matrix, such as an initially computed base expanded matrix, or it may be a previously updated expanded matrix.

In some aspects, updating can be configured to skip updates to base expanded matrix values wherein base expanded matrix values or update values are below a threshold value. This can effect sparse matrix operations, which can reduce computations, preferably without significantly reducing the ANN's accuracy. Updating can be performed in response to at least one of ANN parameter updates, network pruning, dropout, and quantization. A computed update to the base expanded matrix can be employed for computing gradients, and may be used to determine which parameters to update or not update.

In some aspects, data inputs to the ANN can comprise measurements of physical signals, such as Physical-Layer signals used for data communications. The input data may include a signal received in a wireless communication network and/or a signal to be transmitted in the wireless communication network. The data inputs may comprise at least one of an Orthogonal Frequency Multiple Access (OFDM) signal, a discrete Fourier transform spread-OFDM (DFT-s-OFDM) signal, a Sparse Code Multiple Access (SCMA) signal, an OFDM index-modulation (IM) signal, a code-IM signal, a Multiple-Input Multiple Output (MIMO) signal, and a Non-Orthogonal Multiple Access (NOMA) signal.

In disclosed aspects, the ANN may employ a machine learning algorithm that comprises an association-rule machine learning algorithm, a clustering algorithm, a k-means algorithm, a collaborative filtering algorithm, an artificial intelligence algorithm, an artificial neural network algorithm, a recurrent neural network algorithm.

The following patent applications and patents are hereby incorporated by reference in their entireties: U.S. Pat. Nos. 8,670,390, 9,225,471, 9,270,421, 9,325,805, 9,473,226, 8,929,550, 7,430,257, 6,331,837, 7,076,168, 7,965,761, 8,098,751, 7,787,514, 9,673,920, 9,628,231, 9,485,063, patent application Ser. No. 10/145,854, patent application Ser. No. 14/789,949, Pat. Appl. No. 62/197,336, patent application Ser. No. 14/967,633, Pat. Appl. No. 60/286,850, patent application Ser. No. 14/709,936, patent application Ser. No. 14/733,013, patent application Ser. No. 14/789,949, patent application Ser. No. 13/116,984, patent application Ser. No. 15/218,609, patent application Ser. No. 15/347,415, patent application Ser. No. 15/988,898, patent application Ser. No. 16/021,001, patent application Ser. No. 16/307,039, Pat. Appl. No. 62/510,987, Pat. Appl. No. 62/527,603, Pat. Appl. No. 62/686,083, Pat. Appl. No. 62/778,894, Pat. Appl. No. 62/662,140, Pat. Appl. No. 62/536,955, Pat. Appl. No. 62/796,994, 62/853,051, PCT/US16/43852, PCT/US18/43573, and PCT/US2019/037399.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The description that follows includes exemplary systems, methods, techniques, instruction sequences, and computer program products that embody techniques of this disclosure. However, it is understood that the described aspects may be practiced without these specific details. Apparatuses and methods are described in the following description and illustrated in the accompanying drawings by various blocks, modules, components, circuits, steps, processes, algorithms, etc. (collectively referred to as "elements"). These elements may be implemented using electronic hardware, computer software, firmware, or any combination thereof.

Figure 1A:
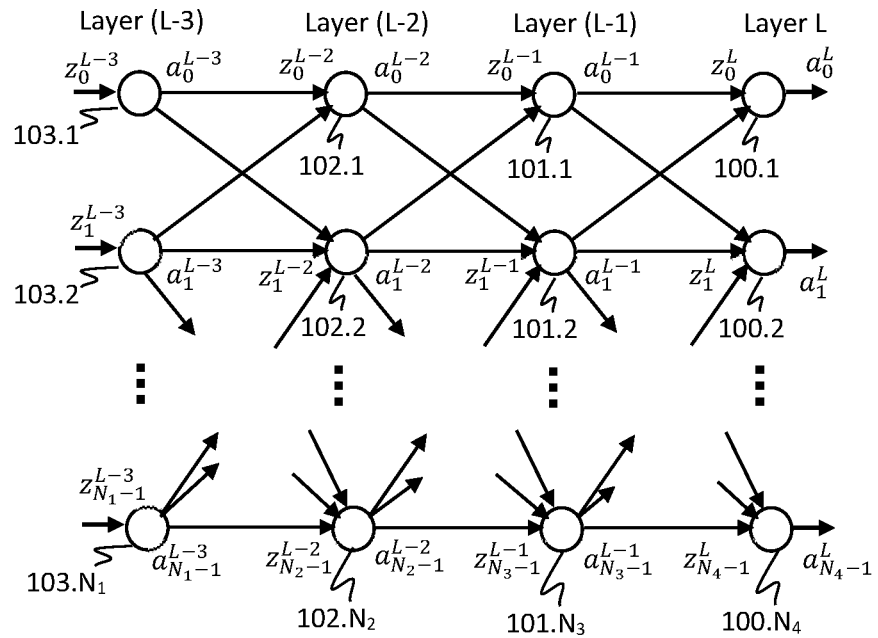
FIG. 1A is a diagram of an ANN that can be configured in accordance with aspects of the disclosure.

FIG. 1A is a diagram of an artificial neural network (ANN), which can be generalized to any of various types and configurations of ANNs, including (but not limited to) deep-learning neural networks, multi-layer perceptrons (MLPs), recursive neural networks (RNNs), recurrent neural networks, bi-directional RNNs, Long Short-Term Memory (LSTM) networks, Gated Recurrent Unit (GRU) networks, Convolutional Neural Networks (CNNs), and others . A simplified ANN topology is illustrated for the purpose of explaining some disclosed aspects. The ANN can comprise a plurality of layers, such as at least (L-3) to L, each layer having one or more neurons (e.g., nodes), such as $N_1$ nodes $103.1, 103.2, \ldots, 103.N_1$ in Layer (L-3), $N_2$ nodes $102.1, 102.2, \ldots, 102.N_2$ in Layer (L-2), $N_3$ nodes $101.1, 101.2, \ldots, 101.N_3$ in Layer (L-1), and $N_4$ nodes $100.1, 100.2, \ldots, 100.N_4$ in Layer L. In some aspects, Layer (L-3) might be the input layer, and Layer L might be the output layer. Each node receives one or more input values, such as data inputs "x" to the ANN and/or output values (e.g., activations) "a" from other nodes in one or more previous layers. The node combines its inputs, possibly with weights and/or possibly with a bias value, to produce a linear combination "z" value. The node may then perform a non-linear activation function on z to produce its output (e.g., activation).

In disclosed aspects, the nodes can employ linear approximations of the non-linear activation functions; or updates to the ANN model, as well as other computations, can be computed using linear approximations. In some aspects, small changes to z are exploited for providing linear updates to the ANN model, or at least to portions of the ANN model. For example, an update to a node's output a can be computed from a linear approximation $\alpha = g \cdot z$ for small changes in z, that approximates the non-linear activation $\alpha = f(z)$, where g is a scalar value that approximates the slope of the activation function $f$ in the vicinity of z. Furthermore, the value of g can be updated to account for the nonlinearity of $f$, and such updates to g can be implemented via linear approximations. A matrix-expansion of the model's output (such as the activations of the final layer, or values computed therefrom, such as error, loss, or cost) can be used to facilitate linear-model updates. In some aspects, updates to g can be implemented using a recursive function (e.g., a recursion operation). In some aspects, the non-linear operation $f$ can be performed using recursion to update the node's output, a. For example, a change in z can be used to compute a number $N_z$ of iterations, or steps, in a recursion operation that updates g or performs $f(z)$. One advantage of recursion operations is that they can improve time efficiency. Another advantage is that recursion functions are easily configured as iterative functions, which may be memory efficient. For example, a recursive function might call itself repeatedly until a certain condition is met, which may alternatively be reformulated as an iterative function, such as wherein a function repeats a particular task until a condition fails.

In practice, disclosed aspects can be adapted to various and adaptable ANN topologies, including (but not limited to) different synaptic pathway configurations (e.g., connectivity between nodes, including any of various feed-forward and/or feedback network topologies, which can include network inputs and/or outputs), different layer configurations, different node configurations, etc. Disclosed aspects can be provisioned for any of various neural network topologies, including (but not limited to) neural networks having different numbers of layers, different numbers of neurons in each layer, and/or different synaptic patterns. Aspects disclosed herein can be configured to operate with various types of artificial neural networks, including (but not limited to) feed forward, multilayer perceptron, deep feed forward, radial basis, convolutional neural networks, recurrent, gated recurrent, long/short term memory, auto encoder, variational auto encoder, denoising auto encoder, sparse, nested, Markov chain, Hopfield, Boltzman machine, restricted Boltzman machine, deep belief, deep convolutional, deep convolutional inverse graphics, deconvolutional, generative adversarial, liquid state machine, extreme learning machine, echo state, deep residual, Kohoren, support vector machine, Neural Turing Machine, sequence-to-sequence, modular neural networks, and combinations thereof.

A layer can comprise one or more neurons (i.e., nodes), each with one or more connections (i.e., synapses) from neurons in a previous layer. The synapses can be weighted to adjust inputs to a node, and the weights (and other ANN parameters) can be adapted as part of a learning process. At Layer (L-1), for example, node 101.1 may provide weights to its inputs, which comprise node outputs from a previous layer, e.g., Layer (L-2), such as outputs $\alpha_0^{L-2}, \alpha_1^{L-2}, \ldots, \alpha_{N_2-1}^{L-2}$ from one or more nodes 102.1-102.$N_2$ to produce combined input $z_0^{L-1}$. At Layer (L-1), for example, node 101.1 can comprise an activation function $f_0^{L-1}$ that operates on the combined input $z_0^{L-1}$ and produces node output $\alpha_0^{L-1}$. In some aspects, the activation function $f_0^{L-1}$ can cause the neuron to be inactive or active, and can scale its output. The activation function can be adapted as part of a learning process, such as with respect to a bias $b_0^{L-1}$.

Figure 2A:
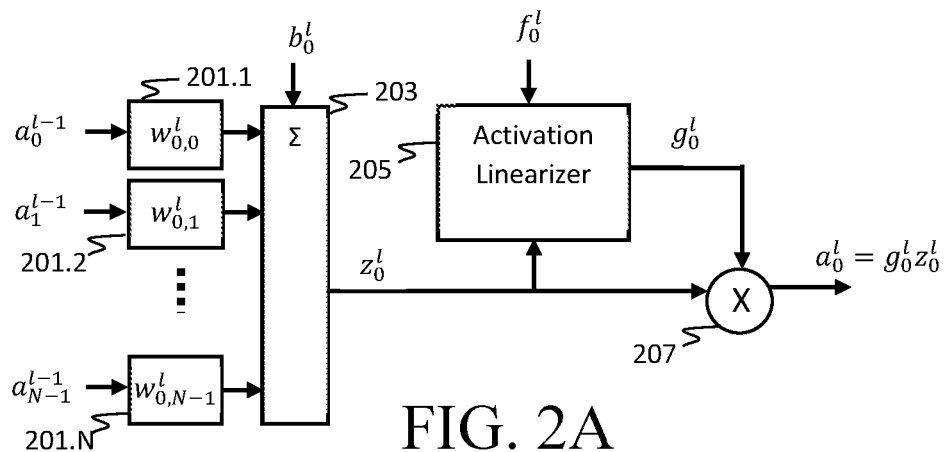
FIG. 2A is a block diagram that depicts a node, or neuron, in an ANN, and operations that can occur in the node according to disclosed aspects.

FIG. 2A is a block diagram that depicts a node of layer l of the ANN, and method operations that can occur in the node. For example, at layer l, N outputs from at least one previous layer (e.g., l-1) $\alpha_0^{l-1}, \alpha_1^{l-1}, \ldots, \alpha_{N-1}^{l-1}$ can be weighted (e.g., multiplied by synaptic weights $w_{0,0}^l, w_{0,1}^l, \ldots, w_{0,N-1}^l$) 201.1-201.N. The weighted inputs are summed 203, possibly with a bias term (e.g., $b_0^l$), to produce a combined input (e.g., $z_0^l$) to the node. The notation, $z_0^l$, includes the combined $\alpha_i^{l-1}$ values (i=1, . . . , N) and may or may not include bias $b_0^l$. The input $z_0^l$ may be operated upon by the activation function (e.g., $f_0^l$) to produce the node's output $\alpha_0^l$. Alternatively, the activation function $f_0^l$ and combined input $z_0^l$ may be input to an activation linearizer 205, which can be configured to provide a linear approximation of the activation function $f_0^l$. In one aspect, the activation linearizer 205 computes a scaling multiplier $g_0^l$ from $f_0^l$ and $z_0^l$. The scaling term $g_0^l$ can be computed based on the slope of $f_0^l$ at, or in the vicinity of, $z_0^l$. A multiplier 207 multiplies $g_0^l$ and $z_0^l$ to produce the product, $\alpha_0^l = g_0^l z_0^l$, which can be a linear approximation of $f_0^l(z_0^l)$. Disclosed aspects include operations wherein the node updates one or more of its corresponding ANN parameters, including its synaptic weights, bias, input, activation function, and/or scaling term.

In one example, layer l might be the input layer, and $z_0^l$ can be the ANN input value, $x_0$. In one example, layer l might be the output layer, and $\alpha_0^l$ can be the ANN output value $y_0$. Alternatively, layer l might be a hidden layer, and the inputs $\alpha_i^{l-1}$ might be outputs from a previous layer and the output $\alpha_0^l$ might be input to a following layer.

Figure 1C:
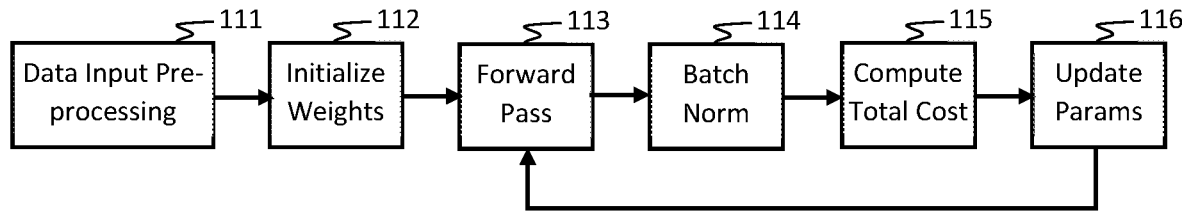
FIG. 1C is a flow diagram that illustrates some method and apparatus aspects configured in accordance with aspects of the disclosure.
Figure 1B:
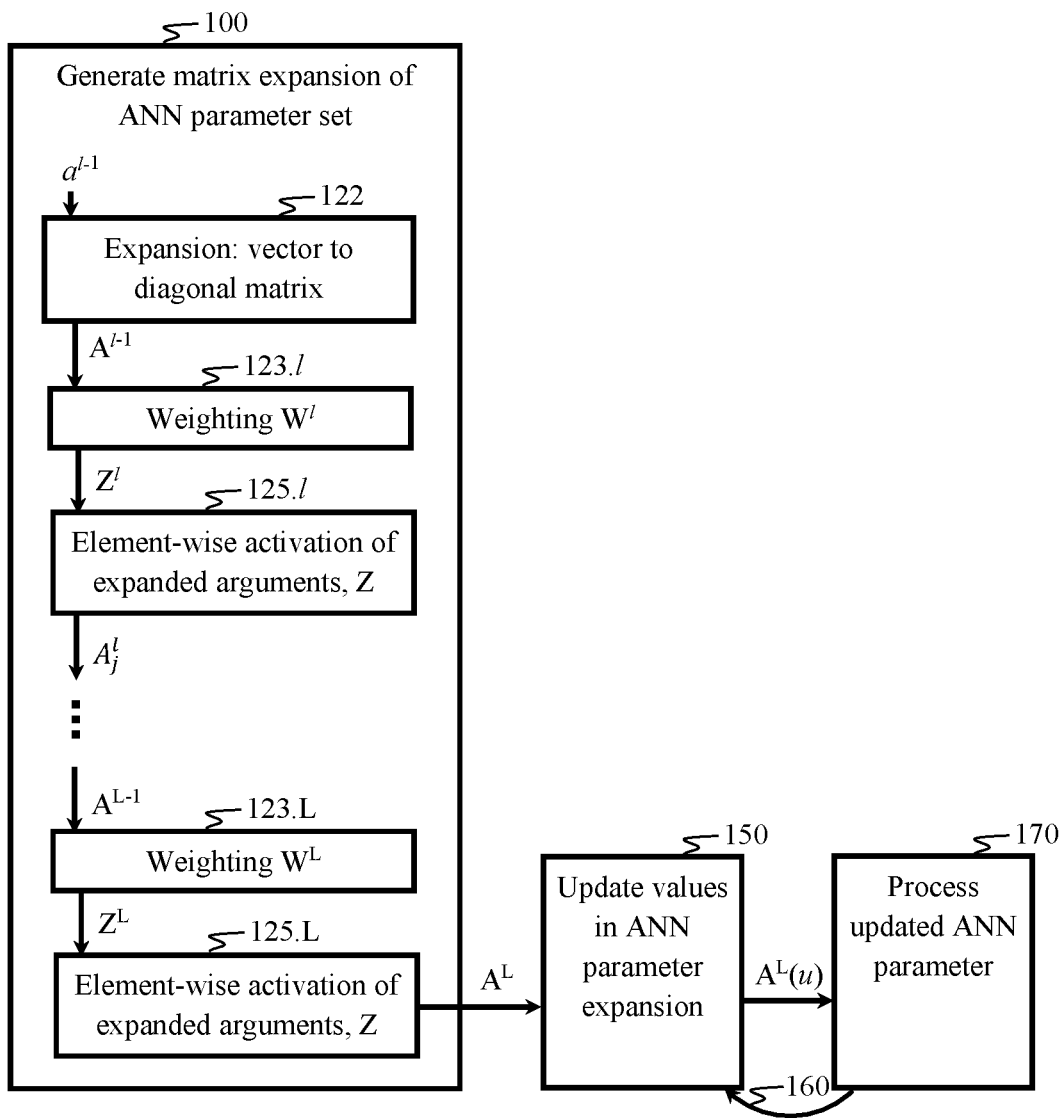
FIG. 1B depicts method, apparatus, and system aspects according to the disclosure.

FIG. 1B depicts method, apparatus, and system aspects of the disclosure. At least one matrix expansion of one or more ANN parameter sets is generated 100. The resulting expansion can be updated 150 by updating values (e.g., in selected one(s) of the columns in the expanded matrix $A^L$). Updates 150 can be additive updates, multiplicative updates, or combinations thereof. The resulting updated expanded matrix $A^L(u)$ can be processed 170 in accordance with ANN processing disclosed herein. ANN processing 170 can include configuring 160 the updates in 150 according to one or more criteria in the processing 170. In one example, ANN parameters are updated via 150 to reduce or minimize a total cost, and might employ gradient descent, momentum, RMSprop, adaptive moment estimation (Adam) optimization algorithm, or related techniques. Processing 170 can include selecting or adapting ANN hyperparameters, referred to herein as hyperparameter tuning.

Matrix expansion 100 comprises increasing the dimensionality of the ANN parameter's data structure. For example, an $N_L \times 1$ vector $\alpha^L$ output at layer L can be expanded to produce an $N_L \times N_L$ matrix $A^L$, from which $\alpha^L$ can be produced by summing the elements in each row of $A^L$. Matrix expansion 100 can apply to other data structure types, such as to expand a matrix to produce a tensor, or to increase the dimension of a tensor.

By way of example, but without limitation, an input vector $\alpha^{l-1}$ to an ANN or a portion of an ANN (denoted as layer l) can be formatted (or otherwise implemented functionally) 122 as a diagonal matrix $A^{l-1}$, whose diagonal elements are the elements of vector $\alpha^{l-1}$:

$$A^{l-1} = \begin{vmatrix} a_0^{l-1} & 0 & \ldots & 0 \\ 0 & a_1^{l-1} & \ldots & 0 \\ \vdots & \vdots & \ddots & \vdots \\ 0 & 0 & \ldots & a_{N-1}^{l-1} \end{vmatrix}$$

This is referred to as a diagonal expansion matrix, or a matrix expansion, of the N×1 vector $\alpha^{l-1}$. The matrix $A^{l-1}$ might be processed by each node in layer l, explicitly or functionally.

An N×1 weight vector $w_j^l$ at each node (indexed by j) in layer l can be implemented functionally as N×N diagonal matrix $W_j^l$ with diagonal elements set to the elements in $w_j^l$:

$$W_j^l = \begin{vmatrix} w_{0,j}^l & 0 & \ldots & 0 \\ 0 & w_{1,j}^l & \ldots & 0 \\ \vdots & \vdots & \ddots & \vdots \\ 0 & 0 & \ldots & w_{N-1,j}^l \end{vmatrix}$$

The product 123.1, $W_j^l \circ A^{l-1}$, can produce an N×N diagonal matrix $Z_j^l$ whose diagonal elements are element-wise products of the diagonal elements of each of $W_j^l$ and $A^{l-1}$. The weighting 123.1 can include a Hadamard product. The Hadamard product (also known as the Schur product or the entrywise product) is a binary operation that takes two matrices of the same dimensions and produces another matrix of the same dimension as the operands, where each element i,j is the product of elements i,j of the original two matrices. For two matrices X and Y of the same dimension m×n, the Hadamard product X∘Y is a matrix of the same dimension as the operands, with elements given by $$(X \circ Y)_{i,j} = (X)_{i,j} (Y)_{i,j}$$

The Hadamard product is associative and distributive. Unlike the matrix product, the Hadamard product is commutative. Thus, in some aspects, matrix forms that commute, and operations thereon, can be configured to provide a result that is analogous to the Hadamard product of two vectors. For example, diagonal matrices or Toeplitz matrices may be employed. Disclosed aspects that exploit this and other features can provide advantageous solutions for training, operating, analyzing, or updating ANNs. Such aspects can improve the functioning of a computer processor and related technological processes disclosed herein. Furthermore, data structures disclosed herein can improve the way a computer processor stores and retrieves data in memory for ANN operations. Some benefits of the disclosed aspects include faster processing time, improved flexibility for updating signal features, and improvements to how a computer stores and reads data from memory to perform ANN operations.

At each (j) node, an element-wise activation 125.1 of the $Z_j^l$ values can be performed to produce an output expanded activation matrix, $A_j^l$. In one aspect, activation 125.1 can comprise summing all of the non-zero elements in $Z_j^l$ to produce a sum z (which is a scalar), which may be operated upon by a non-linear activation function $f_j^l(\cdot)$. In some aspects of the disclosure, the function $f_j^l(\cdot)$ can be approximated via less-complex computations, such as a linear approximation. The argument of $f_j^l(\cdot)$ may further include an added bias $b_j^l$. The output of the non-linear activation function $f_j^l(\cdot)$ can include the scalar activation value $\alpha_j^l$. In aspects of the disclosure, the non-linear activation can be computed as a function of z and then performed element-wise on the $Z_j^l$ values to produce the output expanded activation matrix, $A_j^l$, from which the value $\alpha_j^l$ might be computed by summing the non-zero elements in $A_j^l$. In some aspects, element-wise activation 125.1 can compute an activation scaling term $g_j^l$, where $g_j^l = \alpha_j^l/z$. An N×N diagonal matrix $G_j^l$ whose diagonal elements equal the scaling term $g_j^l$ may be implemented, functionally or explicitly, for scaling the $Z_j^l$ values. The expanded activation matrix $A_j^l$ can be expressed as the following diagonal matrix:

$$A_j^l = \begin{bmatrix} g_j^l w_{0,j}^l a_0^{l-1} & 0 & \cdots & 0 \\ 0 & g_j^l w_{1,j}^l a_1^{l-1} & \ddots & \vdots \\ \vdots & \ddots & \ddots & 0 \\ 0 & \cdots & 0 & g_j^l w_{N-1,j}^l a_{N-1}^{l-1} \end{bmatrix}$$

Note that the matrix $A_j^l$ output at the $j^{th}$ node of level l is a product of diagonal matrices:

$$A_j^l = G_j^l W_j^l A_j^{l-1}$$

Since diagonal matrices commute for multiplication, some disclosed aspects can exploit this property to update a previous numerical computation of matrix $A_j^l$ with an update or updated component of $A_j^l$ (e.g. $A_j^{l-1}$, $W_j^l$, $G_j^l$). If $G_j^l$ is a linear approximation of the activation function, an update to $G_j^l$ can be configured to capture a non-linear aspect of the activation function, and this update can be implemented as a linear update to the numerical computation of $A_j^l$, such that a full numerical recomputation of $A_j^l$ does not need to be performed to capture the nonlinear quality of the activation function. This can comprise an additive or multiplicative update, or a combination thereof. Some aspects provide for a linear update to an expanded matrix downstream (i.e., in the direction of propagation) from level l.

The matrix that is input at each node at layer l+1 is:

$$A^l = \begin{vmatrix} A_0^l & 0 & \cdots & 0 \\ 0 & A_1^l & \cdots & 0 \\ \vdots & \vdots & \ddots & \vdots \\ 0 & 0 & \cdots & A_{N-1}^l \end{vmatrix}$$

Weighting and element-wise activation may be employed for each layer between 1 and L. At layer L, an $N_{L-1} \times N_{L-1}$ diagonal matrix $A^{L-1}$ comprising activation outputs (each of those outputs possibly being diagonal matrices) from each of $N_{L-1}$ nodes in layer L−1 may be provisioned for one or more nodes at layer L. Weighting 123.L using an expanded weight matrix (or functional equivalent) may be performed, followed by an element-wise activation of expanded arguments 125.L. The activation output of each node in layer L may be a row comprising the elements produced by the element-wise activation 125.L. For example, row j of $A^L$ can be expressed as $$A_j^L [g_j^L w_{0,j}^L A_0^{L-1} \; g_j^L w_{1,j}^L A_1^{L-1} \cdots g_j^L w_{N-1,j}^L A_{N-1}^{L-1}]$$

wherein the $A_i^{L-1}$ terms can each comprise a vector of their diagonal elements, and similarly each activation back to the $l^{th}$ layer can comprise a vector of their respective diagonal terms.

The terms in $A^L$ may be arranged with respect to a set of parameters to produce a set of elements, and each element in $A^L$ is computed 140 numerically to produce an initial computed matrix $A^L(0)$. For example, the terms in each row of $A^L$ can be arranged or grouped such that the first element in each row (i.e., column 0 of $A^L$) is a product of a scaling term with a first ANN parameter $p_0$, the second element in each row (i.e., column 1 of $A^L$) is a product of a scaling term with a second ANN parameter $p_1$, and so on. This arranging of terms in $A^L$ by parameter p produces an $A^L$ matrix defined by a particular parameter set. Different $A^L$ matrices may be created with respect to different sets of parameters, and their elements computed numerically 140. In one aspect, an $A^L$ matrix can be created with respect to the inputs $\alpha^{l-1}$. In another aspect, an $A^L$ matrix can be created with respect to a set of the weights $w_{i,j}^l$ in layer l. For example, each of a set of $A^L$ matrices may be created with respect to a common weight index value i or j. In another aspect, an $A^L$ matrix can be created with respect to the z-value at each node in layer l. In another aspect, an $A^L$ matrix can be created with respect to the activation scaling terms in layer l. In another aspect, an $A^L$ matrix can be created with respect to the product of each activation scaling term $g_j^l$ with its corresponding z-value ($g_j^l z$) in layer l. In other aspects, the $A^L$ matrix elements are produced by grouping parameters from other layers (e.g., layer $\lambda \neq l$).

In the update 150, values in one or more columns of $A^L(0)$ can be updated with respect to an update to a parameter that corresponds to the one or more columns. Thus, a partial update to $A^L(0)$ can be effected. The update may be a multiplicative update, an additive update, or both. The update can comprise multiplication of at least one column by an update scaling term. In one aspect, the product of the parameter with the update scaling term equals the updated parameter, so the update 150 can be a multiplicative update. For example, the updated $A^L(u)$ can equal $A^L(0)$ after its one or more columns is updated according to the update scaling term. In another aspect, the product of the parameter with the update scaling term equals the update to the parameter, so the update 150 can comprise an additive update to $A^L(0)$. For example, an update $\Delta A^L$ can equal $A^L(0)$ after its one or more columns is updated according to the update scaling term, and then $\Delta A^L$ can be added to $A^L(0)$ to produce $A^L(u)$.

It should be appreciated that one or more supplemental and/or alternative operations can be implemented with respect to the weights and activation functions, these operations including invertible transforms (e.g., FFTs, wavelet transforms, z-transforms), convolutions, filters, encoding, precoding, eigen-decomposition, singular value decomposition, and others. The methods and apparatus aspects disclosed herein with respect to mathematical operations and matrix (any matrix, including vectors and tensors) structures can be implemented functionally so as to effect the disclosed operations and structures. Some aspects can employ FFTs in a CNN, as convolution can be efficient computed in the Fourier domain, where it becomes elementwise multiplication. Such implementations may not explicitly comprise such structures. For example, expanded matrices, diagonal matrices, and operations thereon may be effected via various data structures and algorithms in computer code, data storage schemes in memory, circuit designs, processor architectures, etc.

An initial output $A^L(0)$ of layer L can be computed based on an initial input, $A^{l-1}(0)$:

$$A^L(0) = G^L W^L \ldots G^l W^l A^{l-1}(0)$$

The operation, $G^L$ can be expressed as a function of the previously computed output $A^L(0)$:

$$G^L = A^L(0)[A^{l-1}(0)]^{-1}[W^l]^{-1}[G^l]^{-1} \ldots [W^L]^{-1}$$

An updated output $A^L(u)$ can be expressed as:

$$A^L(u) = G^L W^L \ldots G^l W^l A^{l-1}(u)$$

Substituting $G^L$ expressed as a function of the previously computed output $A^L(0)$ yields:

$$A^L(u) = A^L(0)[A^{l-1}(0)]^{-1}[W^l]^{-1}[G^l]^{-1} \ldots [W^L]^{-1} W^L \ldots G^l W^l A^{l-1}(u)$$

The terms $[W^L]^{-1} W^L$ reduce to the Identity Matrix I, which can be removed. Subsequent matrices paired with their inverses drop out, so the above expression simplifies to:

$$A^L(u) = A^L(0)[A^{l-1}(0)]^{-1} A^{l-1}(u)$$

which expresses a multiplicative scaling of $A^L(0)$ based on $A^{l-1}(u)$ to produce the updated matrix, $A^L(u)$. Alternatively, an additive update $\Delta A^L$ to $A^L(0)$ can be expressed as (and implemented by):

$$A^L(u) = A^L(0) + \Delta A^L; \quad \Delta A^L = A^L(0)[A^{l-1}(0)]^{-1} \Delta A^{l-1}$$

where $\Delta A^{l-1}$ is the update to $A^{l-1}(0)$: $A^{l-1}(u) = A^{l-1}(0) + \Delta A^{l-1}$. In some aspects, scaling terms disclosed herein (such as $A^L(0)[A^{l-1}(0)]^{-1}$) can be configured to simplify computations. In one aspect, for example, the matrix to be inverted in the scaling term can be selected to be invertible (e.g., nonsingular, or non-degenerative).

In one aspect, $A^{l-1}(u) = A^{l-1}(0)A_u$ or $\Delta A^{l-1} = A^{l-1}(0)A_u$, where $A_u$ is a selected multiplicative matrix update to $A^{l-1}(0)$. Thus, $A^L(u) = A^L(0)A_u$; or $\Delta A^L = A^L(0)A_u$, and $A^L(u) = A^L(0)(I + A_u)$. Such aspects may be used in any of the examples disclosed herein.

An initial output $A^L(0)$ of layer L can be computed based on an initial weight matrix, $W^l(0)$:

$$A^L(0) = G^L W^L \ldots G^l W^l(0) A^{l-1}$$

The operation, $G^L$ can be expressed as a function of the previously computed output $A^L(0)$:

$$G^L = A^L(0)[A^{l-1}]^{-1}[W^l(0)]^{-1}[G^l]^{-1} \ldots [W^L]^{-1}$$

An updated output $A^L(u)$ can be expressed as:

$$A^L(u) = G^L W^L \ldots G^l W^l(u) A^{l-1}$$

Substituting $G^L$ expressed as a function of the previously computed output $A^L(0)$ yields:

$$A^L(u) = A^L(0)[A^{l-1}]^{-1}[W^l(0)]^{-1}[G^l]^{-1} \ldots [W^L]^{-1} W^L \ldots G^l W^l(u) A^{l-1}$$

which can simplify to:

$$A^L(u) = A^L(0)[A^{l-1}]^{-1}[W^l(0)]^{-1} W^l(u) A^{l-1}$$

which can be used to implement a multiplicative update. The disclosed examples herein may be adapted to provide additive updates. The initial weight matrix $W^l(0)$ might be selected to simplify the computation of its inverse. In one aspect, if $W^l(u) = W^l(0) W_u$, where $W_u$ is a multiplicative update matrix, then $$A^L(u) = A^L(0)[A^{l-1}]^{-1} W_u A^{l-1}$$

$W_u$ can be configured to simplify the above expression. If the weight updates are constrained to $W_u = A^{l-1} \Omega_u$, where $\Omega_u$ is some update matrix, then $$A^L(u) = A^L(0) \Omega_u A^{l-1}$$

which can reduce the complexity of the update computations.

In some aspects, two or more terms in the matrix expansion can be configured to form a commutative algebra. By way of example, if $W_u$ and $A^{l-1}$ or $W_u$ and $[A^{l-1}]^{-1}$ form a commutative algebra, then $$A^L(u) = A^L(0) W_u$$

Thus, a commutative-algebra constraint can simplify update computations. In one aspect, $W_u$ and $A^{l-1}$ or $W_u$ and $[A^{l-1}]^{-1}$ can be circulant matrices.

An initial output $A^L(0)$ of layer L can be computed based on an initial activation scaling matrix, $G^l(0)$ and argument $Z^l(0)$:

$$A^L(0) = G^L W^L \ldots G^l(0) Z^l(0)$$

The operation $G^L$ can be expressed as a function of the previously computed output $A^L(0)$:

$$G^L = A^L(0)[Z^l(0)]^{-1}[G^l(0)]^{-1} \ldots [W^L]^{-1}$$

Substituting $G^L$ expressed as a function of the previously computed output $A^L(0)$ yields:

$$A^L(u) = A^L(0)[Z^l(0)]^{-1}[G^l(0)]^{-1} \ldots [W^L]^{-1} W^L \ldots G^l(0) Z^l(u)$$

which can simplify to:

$$A^L(u) = A^L(0)[Z^l(0)]^{-1} Z^l(u)$$

In one aspect, $Z^l(u)$ is a scaled version of $Z^l(0)$: $Z^l(u) = Z^l(0)\zeta_u$, where $\zeta_u$ can be a diagonal scaling matrix, thus a multiplicative update can be performed: $A^L(u) = A^L(0)\zeta_u$. In another aspect, an additive update can be performed as follows:

$$A^L(u) = A^L(0) + \Delta A^L; \quad \Delta A^L = A^L(0)[Z^l(0)]^{-1} \Delta Z^l$$

where $Z^l(u) = Z^l(0) + \Delta Z^l$.

In another aspect, $G^l(0)$ can be updated as follows. Substituting $G^L$ expressed as a function of the previously computed output $A^L(0)$ yields:

$$A^L(u) = A^L(0)[Z^l(0)]^{-1}[G^l(0)]^{-1} \ldots [W^L]^{-1} W^L \ldots G^l(u) Z^l(0)$$

which can simplify to:

$$A^L(u) = A^L(0)[Z^l(0)]^{-1}[G^l(0)]^{-1} G^l(u) Z^l(0)$$

which simplifies further if $G^l(0)$, $G^l(u)$, and $Z^l(0)$ are diagonal matrices (and thus commute under multiplication):

$$A^L(u) = A^L(0)[G^l(0)]^{-1} G^l(u)$$

In one aspect, $G^l(u) = G^l(0)\gamma_u$, where $\gamma_u$ is a diagonal scaling matrix, so $A^L(u) = A^L(0)\gamma_u$ provides a multiplicative update. In another aspect, an additive update is performed:

$$\Delta A^L(u) = A^L(0)[G^l(0)]^{-1} \Delta G^l$$

and $A^L(u) = A^L(0) + \Delta A^L$.

In some aspects, both $G^{l'}(0)$ and $Z^l(0)$ are updated, wherein the update to $Z^l(0)$ can necessitate the update to $G^l(0)$. In one aspect, the updated $Z^l(u)=Z^l(0)+Z_1+Z_2$, where $Z_1$ is the distance from $Z^l(0)$ to a Z-breakpoint of a PWL approximation of the nonlinear activation function where $G^l(0)$ becomes $G^l(u)$, and $Z_2=\Delta Z^l - Z_1$. Thus, one approximation of an additive update might be:

$$\Delta A^L = A^L(0)[Z^l(0)]^{-1}Z_1 + A^L(0)[Z^l(0)]^{-1}[G^l(0)]^{-1}G^l(u)Z_2$$

Another approximation might compute a scaling factor $G^l(u')$ for the entire amount of $\Delta Z^l$ that approximates the combined effect of $G^l(0)$ employed up to the break point (0 to $Z_1$) and $G^l(u)$ employed after the break point is crossed ($Z_1$ to $\Delta Z^l$).

An initial output $A^L(0)$ of layer L can be computed based on an initial activation scaling matrix, $G^1(0)$:

$$A^L(0) = G^L W^L \ldots G^l(0) W^l A^{l-1}$$

The operation, $G^L$ can be expressed as a function of the previously computed output $A^L(0)$:

$$G^L = AL(0)[A^{l-1}]^{-1}[W^l]^{-1}[G^l(0)]^{-1} \ldots [W^L]^{-1}$$

Substituting $G^L$ expressed as a function of the previously computed output $A^L(0)$ yields:

$$A^L(u) = A^L(0)[A^{l-1}]^{-1}[W^l]^{-1}[G^l(0)]^{31\ 1} \ldots [W^L]^{-1} W^L \ldots G^l(u) W^l A^{l-1}$$

which can simplify to:

$$A^L(u) = A^L(0)[A^{l-1}]^{-1}[W^l]^{-1}[G^l(0)]^{-1}G^l(u) W^l A^{l-1}$$

In some aspects, the above expression can simplify to:

$$A^L(u) = A^L(0)[G^l(0)]^{-1}G^l(u)$$

such as if $[G^l(0)]^{-1}G^l(u)$ is a multiple of the Identity matrix, or if $W^l$ is configured to be diagonal.

In some aspects, operators disclosed herein can comprise an interpolating function, such as an interpolation filter. In some aspects, an operator can employ a Vandermonde matrix. In any of the disclosed aspects, an MN×MN expanded matrix might be computed from an N×N matrix. In some aspects, an operator might-comprise an MN-point transform (where M is an integer>1) configured to operate on an MN×MN matrix constructed, for example, by performing "zero stuffing" or "zero padding" of its input. One aspect might employ an expanded operator, such as an MN-point interpolation filter that operates on an MN×MN zero-stuffed operand matrix to produce an MN×MN expanded matrix.

Figure 2B:
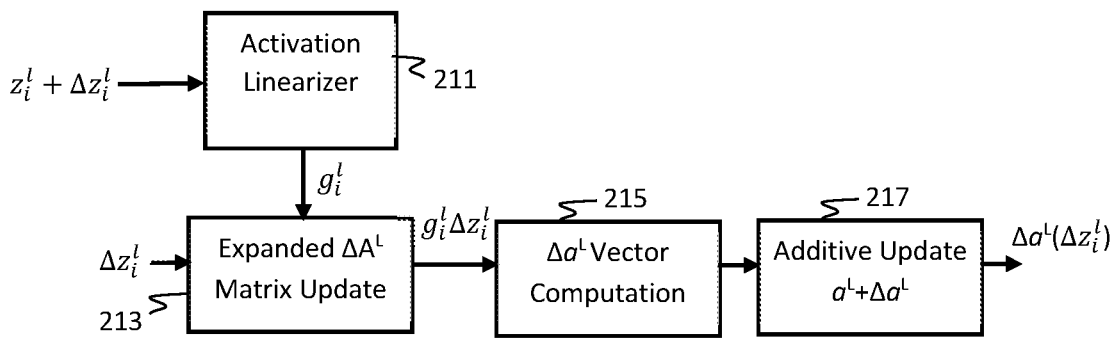
FIG. 2B is a block diagram that depicts a method in which an additive update to a linear ANN model can be performed according to some aspects of the disclosure.
Figure 2C:
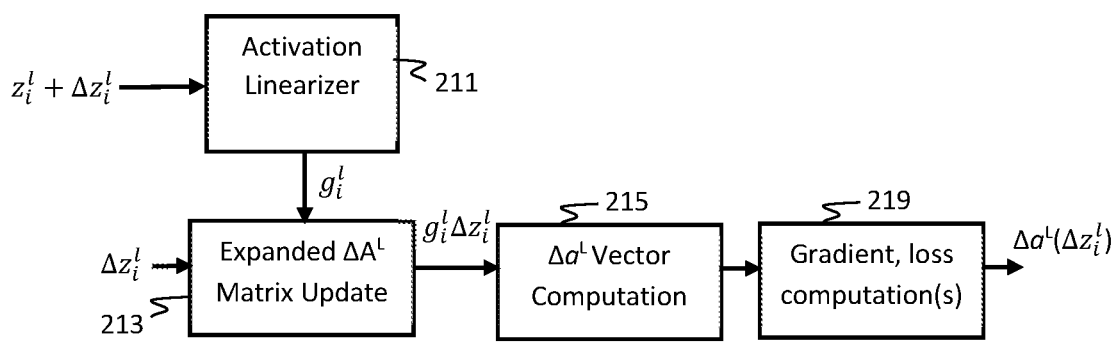
FIG. 2C is a block diagram that depicts an additive update to a linear ANN model that can be configured for an output computation, such as a gradient computation and/or a computation of a change in error, loss, or cost.

FIG. 2B is a block diagram that depicts a method in which an additive update to a linear ANN model can be configured. An updated $i^{th}$ node's input $z_i^l + \Delta z_i^l$ can be processed by an activation linearizer 211, which compares the input to one or more thresholds, such as breakpoint values for linear segments in the linear approximation of the activation function, and outputs one or more corresponding activation scaling terms $g_i^l$ to an update 213 of a layer output in expanded-matrix form. The ANN output at layer L ($A^L$) or some other layer ($A^{l'}$) can be provisioned in an expanded-matrix form to enable additive and/or multiplicative updates. In one example, an expanded-matrix form of $A^L$ comprises elements that are factors of $z_i^l$ (e.g., one or more of the $z_i^l$ inputs at layer l), and denoted by $A^L(z_i^l)$. In some aspects, $A^L$ might comprise elements that are factors of $g_i^l z_i^l$, denoted by $A^L(g_i^l z_i^l)$. The elements of $A^L$ may be computed numerically. By way of example, an expanded-matrix update (e.g., $\Delta A^L(g_i^l z_i^l)$) can be computed 213 by scaling the elements of $A^L$ by the $\Delta z_i^l$ and $g_i^l$ values. The update value $\Delta z_i^l$ may be partitioned across multiple linear segments of the approximation. For example, for two partitions, $\Delta z_i^l = \Delta z_i^{l(1)} + \Delta z_i^{l(2)}$, where the first partition $\Delta z_i^{l(1)}$ corresponds to a first segment (and scaling term $g_i^{l(1)}$) and the second partition $\Delta z_i^{l(2)}$ corresponds to a second segment (and scaling term $g_i^{l(2)}$), the expanded matrix update $\Delta A^L$ might comprise a sum of a first update computed from $g_i^{l(1)} \Delta z_i^{l(1)}$ and a second update computed from $g_i^{l(2)} \Delta z_i^{l(2)}$. Each expanded matrix update can be converted 215 to an update vector $\Delta \alpha^L$ by summing the terms in each row. The update vector(s) $\Delta \alpha^L$ can be additive vectors, which may be added 217 together to produce an output vector $\alpha^L$, or may be added 217 to a previous output vector to $\alpha^L(0)$ to produce an updated output vector $\alpha^L(u)$. In multiplicative-update aspects, the $\Delta z_i^l$ and $g_i^l$ values are scaling terms that operate on $A^L$ to produce at least one updated $A^L$, which may be converted to $\alpha^L$ to produce an updated output vector $\alpha^L(u)$ FIG. 2C is a block diagram that depicts an additive update to a linear ANN model configured for an output computation 219, such as a gradient computation and/or a computation of a change in error, loss, or cost. It should be appreciated that any of various types of linear approximation 211 can be used in the disclosed aspects.

In the disclosed aspects, piecewise linear (PWL) approximation can provide low maximum and average error with low computational complexity. An approximation might employ the A-law companding technique. In some aspects, the linear approximation is configured such that the gradient of each linear segment is expressed as a power of two. This enables replacing multipliers with shifters. PWL activation functions have zero curvature (i.e., constant first-order derivative) inside each interval divided by its break points.

Figure 3A:
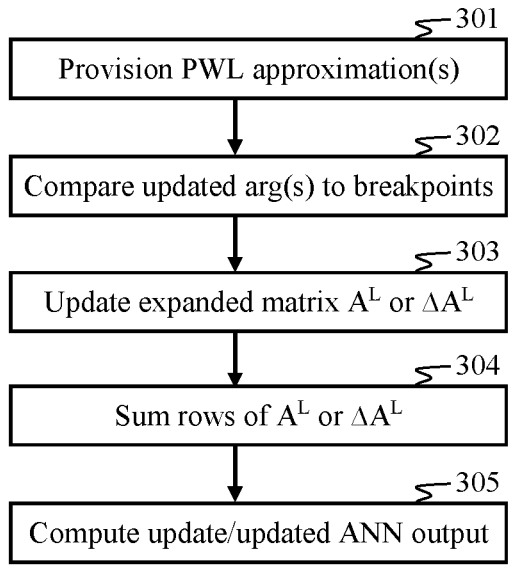
FIGS. 3A, 3B, 3C, and 3D are flow diagrams that depict some aspects of the disclosure.
Figure 3B:
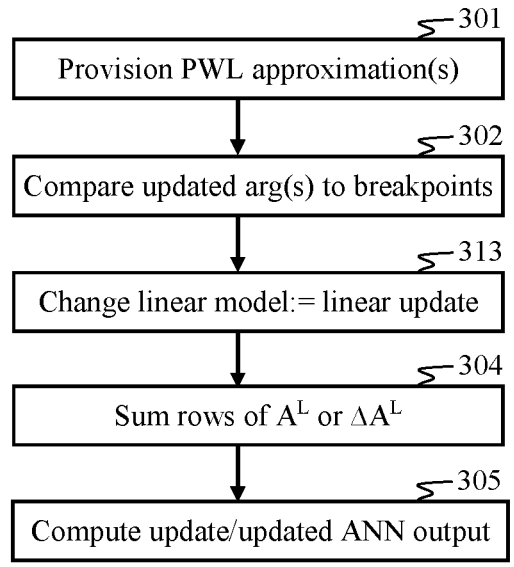

In some aspects, such as depicted in FIGS. 3A and 3B, a PWL approximation may comprise dividing the nonlinear activation function into segments 301, which can include exploiting symmetry (e.g., in sigmoid, tanh, etc.) to reduce the number of computations. An update to the activation function's argument can be compared to the linear approximation's breakpoints 302. IF the updated argument does not transition any of the breakpoints, an update to the ANN model is computed as a linear update to the expanded matrix $A^L$ 303. This update 303 may be any combination of additive and multiplicative updates, and can comprise multiplying corresponding column(s) of an expanded matrix (e.g., $A^L$ and/or $\Delta A^L$) with one or more scaling terms. Rows of the update matrix $\Delta A^L$ and/or updated matrix $A^L$ can be summed 304 to produce update $\Delta \alpha^L$ or updated $\alpha^L$. One or more of the ANN's updated output parameters (and/or changes to those output parameters) can be computed 305 from the update $\Delta A^L$ or updated $A^L$, or update $\Delta \alpha^L$ or updated $\alpha^L$. The ANN output parameters can include expectations (y), error, loss, cost, and/or the gradients thereof.

In some aspects, the comparison 302 may indicate that an updated argument transitions one or more of the breakpoints. The change(s) in the linear model due to such transitions can comprise one or more linear updates 313 to the ANN model, such as by performing a linear multiplicative and/or additive update to expanded matrix $A^L$ or $\Delta A^L$. Rows of the update and/or updated matrix can be summed 304, and one or more of the ANN's updated output parameters (and/or changes to those output parameters) can be computed 305. One aspect provides for linearizing 301, at finite quantization intervals, the nonlinear activation functions to provide a PWL approximation. An update to the argument(s) of an activation function is evaluated 302 with respect to the breakpoints of the PWL approximation (which define each quantization interval in the PWL approximation). For an argument update that spans multiple quantization intervals, an additive update 313 to $A^L$ (or $\Delta A^L$) can be performed as a sum of partial updates:

$$A^L(u) = \sum_{k=0}^{K-1} A^L(0)(g_i^l(k), \Delta z_i^l(k))$$

where $A^L(0)$ denotes an initial or previous update of the expanded matrix $A^L$, k is an index that spans the set of K quantization intervals, $\Delta z_i^l(k)$ is the extent of the argument update in the $k^{th}$ quantization interval, $g_i^l(k)$ is the activation scaling term of the $k^{th}$ quantization interval, and $A^L(0)(g_i^l(k), \Delta z_i^l(k))$ denotes the initial or previous expanded matrix $A^L$ with corresponding ones of its columns comprising update terms $\Delta z_i^l(k)$ and $g_i^l(k)$.

The process of updating $A^L(0)$ with $\Delta z_i^l(k)$ and $g_i^l(k)$ can comprise a sparse-matrix update, as only a subset of its columns are updated. $\Delta A^L$ can comprise a sparse matrix operation on $A^L$, wherein only a subset of the columns in $A^L$ are provisioned as the one or more columns in $\Delta A^L$. Updates to $A^L$ or $\Delta A^L$ with respect to any of the other ANN parameters can comprise sparse-matrix updates. Sparse-matrix updates to an expanded matrix can take the form of multiplying the expanded matrix with a sparse diagonal matrix (i.e., wherein at least one of the diagonal elements are zero). However, such operations can be effected by bit-shifting, sign changes, and/or zeroing elements, such as disclosed herein. The hardware and/or software disclosed herein can optimize expanded-matrix processing operations and/or partial updates, and can include a variety of optimization solutions for sparse processing. A GPU architecture can be adapted for optimizing global memory access, optimizing shared memory access, and exploiting reuse and parallelism. Optimizing sparse processing operations can include characterizing memory access cost, access pattern, type and level of memory, and exploiting data locality. Exploiting reuse can include caching each element in on-chip memories, and exploiting parallelism can include employing synchronization-free parallelism. Aspects disclosed herein can provide for optimizing dense and/or sparse operations (including sparse matrix-matrix multiplication, sparse transforms, and other operations that involve or are based upon matrix expansion and/or expanded linear transform operations) on graphics processing units (GPUs) using model-driven compile- and run-time strategies.

Figure 3C:
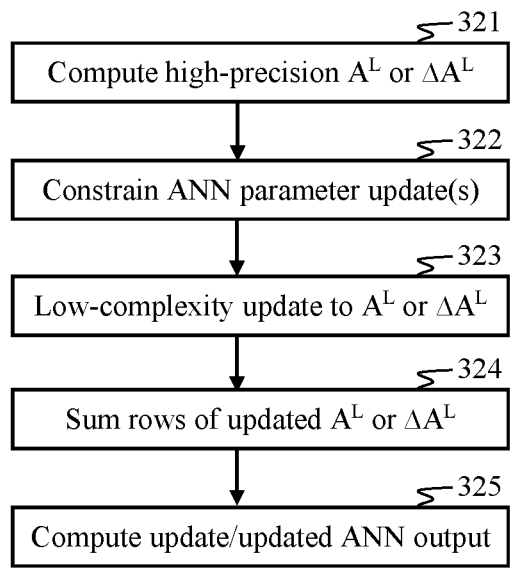
Figure 3D:
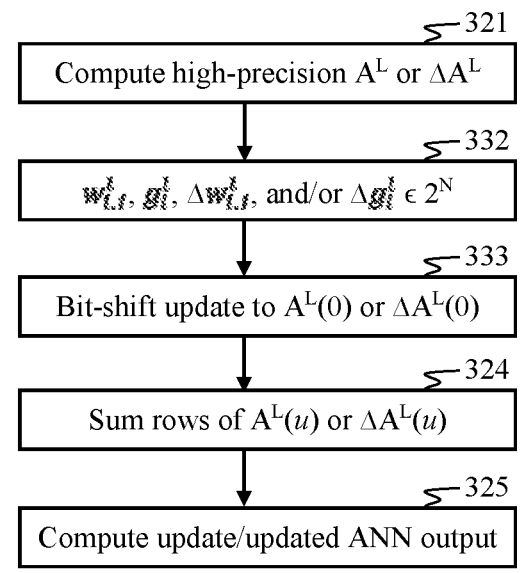

Some aspects can exploit mixed-precision ANN parameters, such as depicted in FIGS. 3C and 3D. In one aspect, some values within the ANN can be high precision, whereas at least some parameters or parameter updates can be configured 322 to be low precision. An initial computation of $A^L$, $\Delta A^L$, $\alpha^L$, and/or $\Delta \alpha^L$, for example, might comprise high-precision operations 321, and updates 323 can be provisioned with low-precision values (from 322) in a process that simplifies update operations 323 that are performed on the initial computation (e.g., $A^L(0)$ and/or $\Delta A^L(0)$). The rows of the updated expanded matrix (e.g., $A^L(u)$ and/or $\Delta A^L(u)$) may be summed 324. By way of example, but without limitation, updates to some parameters (e.g., weights $w_{i,j}^l$ and/or activation scaling terms $g_i^l$) can be constrained to a simplifying update constraint, such as a set of low-precision values that are powers of two 332 (or some other simplifying update constraint), such that an update to the initial (or a previous) computation of $A^L$, $\Delta A^L$, $\alpha^L$, and/or $\Delta \alpha^L$ can be implemented with low-complexity operations, such as bit shifting 333. Ternary values (−1,0,1) are another possible simplifying update constraint that can be implemented in 322. By way of example, a low-complexity update 323 to elements in $A^L(0)$ and/or $\Delta A^L(0)$ might comprise performing sign changes, zeroing out (e.g., discarding) terms, or combinations thereof. In some aspects, activation functions, such as ReLU, provide for a simple update mechanism by employing a slope of one when activated, and zero (or close to zero) when deactivated. Thus, the non-linearity of the ReLU can be implemented by selecting or deselecting terms in an expanded matrix, such as (but not limited to) $A^L$, $\Delta A^L$, or Z.

In one example, a sigmoid function $y=f(x)$ can be implemented as follows. Since the sigmoid function has a symmetry point at (0, 0.5), only half of the x-y pairs need to be explicitly computed (e.g., $y_{x>0}=1-y_{x\leq}0$ or $y_{x<0}=1-y_{x\geq}0$). Thus, the following computations need only be performed on the absolute value of x:

| Operation | Condition |
| --- | --- |
| y = 1 | $\|x\| \geq 5$ |
| y = 0.03125 · $\|x\|$ + 0.84375 | $2.375 \leq \|x\| < 5$ |
| y = 0.125 · $\|x\|$ + 0.625 | $1 \leq \|x\| < 2.375$ |
| y = 0.25 · $\|x\|$ + 0.5 | $0 \leq \|x\| < 1$ |

In this aspect, the slopes and intercepts are powers of two, which can enable the ANN to use shift and addition operations to perform updates. The expanded matrix update 213 can advantageously be implemented via shifting the values in $A^L$, such as due to updates in $g_i^l$ values, since the slopes are powers of two. In some aspects, a bias term (added to the $z_i^l$) can be configured to change the activation function's output (e.g., y) by a factor that is a power of two or by an additive amount that is a power of two, such as to enable the expanded matrix update 213 to be implemented via bit-shifting operations. Similarly, updates $\Delta a_i^l$ can be configured to be implemented in the expanded matrix update 213 via shifting operations. For example, updates $\Delta z_i^l$ can be constrained to powers of two. Configuring the updates $\Delta z_i^l$ to be constrained to powers of two can be achieved, for example, by implementing methods that involve constraining the constituent values of $z_i^l$ or their updates to powers of two. For example, an update to a weight value $w_{i,j}^l$ can result in the update $\Delta z_i^l = \Delta w_{i,j}^l \alpha_i^{l-1}$. Thus, one aspect might configure weights W and the node outputs to be powers of two. Another aspect might adapt the weights $w_{i,j}^l$ to cause $\Delta z_i^l$ to be a power of two. Some aspects can configure the change in the node's activation (e.g., $g_i^l \Delta z_i^l$, or a sum of changes in the activation) to be a power of two so the update to $A^L$ can be performed by shifting the corresponding numerical values in $A^L$.

One approach provides linearizing, at finite quantization intervals, the nonlinear functions used to model neuron activations via piecewise linear approximation. These solutions provide parameters corresponding to each quantization interval, such that the implementation of a different neuron model for certain aspects of the present disclosure may involve a simple substitution of the parameters. Further solutions provide for linear updates when a function's argument is updated to some value beyond a finite quantization interval, such that the change in the function's linear approximation is itself modeled as a linear approximation. For example, when an update to the argument causes the argument to transition from one quantization interval to another quantization interval (e.g., across a breakpoint), wherein each quantization interval corresponds to a different piece of the piecewise linear approximation, the update to the activation can be modeled as a linear update.

Some examples of activation approximations include the Taylor expansion method, the average slope method, linear extrapolation, linear prediction, the first order linear interpolation method, and the optimal linear interpolation method. An affine transformation may be employed.

Some aspects can use an algorithm based on the centered recursive interpolation (CRI) method, which is designed to improve the accuracy recursively. A CRI method begins with initializing three straight lines:

$y_1(x)=0$,
$y_2(x)=0.5*(1+x/2)$
$y_3(x)=1$

Since only the positive x-axis needs to be considered, the CRI algorithm is as follows:

$g(x)=y_2(x)$;
$h(x)=y_3(x)$;
for (i=0; i=q; i++){
    $g'(x)$=Min $[g(x),h(x)]$;
    $h(x)=0.5*(g(x)+h(x)$ delta);
    $g(x)=g'(x)$;
    delta=delta/4; }
$g(x)$=Min$[g(x),h(x)]$;

where q is the interpolation level, delta is the depth parameter dependent on q, h(x) is the linear interpolation function, and g(x) is the resulting approximation. Neither multiplications nor divisions are needed, since they are reduced to shiftings. Suggested values for delta are:

0.30895 for q=1 (5 segments)
0.28094 for q=2 (9 segments)
0.26588 for q=3 (17 segments)

Figure 4A:
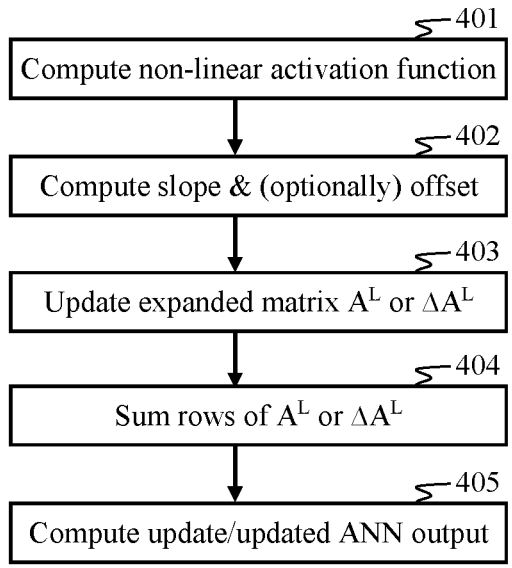
FIGS. 4A, 4B, 4C, and 4D depict method and apparatus configurations according to some aspects of the disclosure.
Figure 4B:
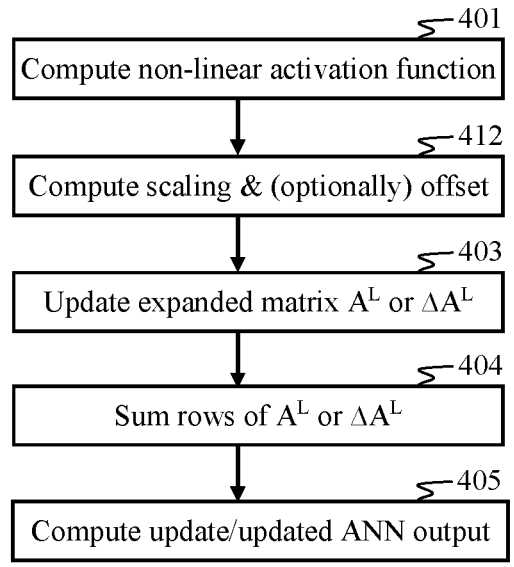

FIG. 4A is a block diagram that depicts a linear update to an ANN model based on an update to a non-linear activation function. For a given updated value of $z_i^l(u)$, its activation can be computed 401 to produce an updated activation $\alpha_i^l(u)$. In some aspects, control passes to step 403, where an expanded matrix update to $A^L$ can be performed 403. The update 403 can be performed via various ways. In one aspect, the updated activation $\alpha_i^l(u)$ value can be substituted in place of its initial or previous activation value $\alpha_i^l(0)$ in an expression for the initial or previous expanded matrix $A^L(0)$ to produce an updated expanded matrix $A^L(u)$. The rows of $A^L(u)$ can be summed 404 to produce an updated $\alpha^L$, $(\alpha^L(u))$.

In some aspects, the update 403 can employ numerically computed elements of an expanded scaling matrix $A^L[p]$ of a parameter "p", $$A^L[p] = \begin{bmatrix} a_{0,0}^L & a_{0,1}^L & \cdots & a_{0,N-1}^L \\ a_{1,0}^L & a_{1,1}^L & \cdots & a_{1,N-1}^L \\ \vdots & \vdots & \ddots & \vdots \\ a_{N-1,0}^L & a_{N-1,1}^L & \cdots & a_{N-1,N-1}^L \end{bmatrix} \begin{bmatrix} 1 & 0 & \cdots & 0 \\ 0 & 1/p & \ddots & \vdots \\ \vdots & \ddots & \ddots & 0 \\ 0 & \cdots & 0 & 1 \end{bmatrix}$$

wherein p can be any ANN parameter, e.g., $\alpha_i^l$. Some elements of $A^L$ (e.g., one or more columns in the first matrix on the right side of the above equation) can comprise numerically computed multipliers that multiply (e.g., scale) p. For example, at least the second column of $A^L$ can comprise products of scaling terms with p. As shown above, p can be removed from the second column of $A^L$ to produce $A^L[p]$. Thus, scaling terms in the second column of $A^L[p]$ are $\alpha_{0,1}^L/p, \alpha_{1,1}^L/p, \ldots, \alpha_{N-1,1}^L/p)$. In one aspect of the update 403, the numerically computed scaling terms of p in $A^L[p]$ can be multiplied by an updated parameter p(u) to produce an updated expanded matrix $A^L(u)$. For example, matrix $A^L[p]$ might be multiplied by a diagonal matrix having at least one diagonal element equal to p(u). In this example, the second diagonal element can be p(u), which corresponds to the second column of $A^L[p]$. In another aspect of the update 403, the numerically computed scaling terms of p in $A^L[p]$ can be multiplied by an update parameter $\Delta p(u)$ to produce an updated expanded matrix $\Delta A^L(u)$, which can be added to an initial or previous $A^L(0)$ to produce $A^L(u)$. Multiplication described herein can be simplified to bit-shifting operations, such as if p(u) or $\Delta p(u)$ are constrained to powers of two. Thus, the bits in the scaling terms can be shifted in accordance with values of p(u) or $\Delta p(u)$. Updates with low computational complexity can be employed by using other parameter constraints, such as ternary values, e.g., (−1,0,1), or binary values, e.g., (0,1) or (−1,1).

In some aspects, update 403 may include providing for summing all the scaling terms of a subject parameter p in each row of $A^L[p]$ to produce a single scaling term. Thus, update 403 may provide for a single column of scaling terms in $A^L[p]$. The one or more other elements in each row that do not scale p may also be summed, resulting in a single column of constant terms in $A^L[p]$. Thus, $A^L[p]$ may be a two-column matrix, comprising a scaling vector $\alpha^L[p]$ or $\Delta\alpha^L[p]$, and a vector of constants c[!p] that do not operate on p. The update 403 can provide for element-wise multiplication (such as a Hadamard product) of a vector of p(u) or $\Delta p(u)$ values with the scaling vector in $A^L[p]$ to produce scaled values of p(u) or $\Delta p(u)$. This multiplication may be implemented via bit-shifting the values in the scaling vector according to the values in the vector p(u) or $\Delta p(u)$ values. The scaled and constant values may be summed 404 in some aspects. An update or updated ANN output parameter may be computed 405.

In some aspects, a scaling term (and optionally an intercept) can be computed 412 to approximate the nonlinear activation of an update argument $\Delta z$. In one aspect, an expanded $A^L$ matrix can be updated by the scaled $\Delta z$. An additive update based on the optional offset may be provided. In some aspects, the scaling term and the offset are set to values that are powers of two, wherein the sum of scaled $\Delta z$ and the offset approximates the update to the nonlinear activation.

The updated parameter p(u) may be the updated activation $\alpha_i^l(u)$ or the update activation (e.g., the change in activation, $\Delta\alpha_i^l=\alpha_i^l(u)-\alpha_i^l(0)$. The value $\Delta\alpha_i^l$ might be configured to be a power of two, such that multiplying the factors can be effected via bit-shifting operations. For example, the argument(s) of the activation function (e.g., $z_i^l$, $b_i^l$) can be configured such that the values $\alpha_i^l$ or $\Delta\alpha_i^l$ are powers of two. In some aspects, the update 403 can comprise quantizing each parameter value (e.g., p(u) or $\Delta p(u)$) to a power of two. For example, $\Delta\alpha_i^l$ may be quantized to the power-of-two value nearest to $\alpha_i^l-\alpha_i^l(0)$.

In some aspects, step 402 is employed, wherein at least a slope (e.g., a $g_i^l$ value) is computed 402 from the current $(z_i^l(u), \alpha_i^l(u))$ pair and a previous $(z_i^l(0),\alpha_i^l(0))$ pair. The slope of the activation function $f_i^l(z_i^l)$ can be approximated as:

$$g_i^l \approx \frac{\alpha_i^l(u) - \alpha_i^l(0)}{z_i^l(u) - z_i^l(0)}$$

In one aspect, $\alpha_i^l(u) = \alpha_i^l(0) + g_i^l \Delta z_i^l$, where $\Delta z_i^l = (z_i^l(u) - z_i^l(0))$. In this case, the parameter $p = g_i^l \Delta z_i^l$. Update 403 can provide for multiplying matrix $A^L[g_i^l \Delta z_i^l]$ with $g_i^l \Delta z_i^l$, and then summing the product with an initial or previous $A^L$. In some aspects, $g_i^l \Delta z_i^l$ can be quantized to a power of two, and the multiplication can be implemented via bit-shifting corresponding numerical values in $A^L[g_i^l \Delta z_i^l]$.

In some aspects, an offset value $\mu$ is computed to reduce the quantization error in $g_i^l \Delta z_i^l$, and the offset value $\mu$ may be constrained to be a power of two. The update 403 can comprise bit shifting the matrix $A^L[g_i^l \Delta z_i^l]$ with respect to $\mu$ to produce an additive update to an initial or previous $A^L$. Offset values may be employed to reduce quantization error with respect to any of the other ANN parameters.

It has been observed that while training an ANN, the learned parameters (e.g., weights and biases) often change by only small amounts upon each iteration, which can be exploited to provide linear approximations to the nonlinear activations, and thus, to the ANN model or portions thereof. When ReLU activation functions are employed, for example, it is often observed that nodes are in an activated or de-activated state for many iterations while learning. Thus, many iterations can employ updates to the ANN via linear approximations, at least for a portion of the ANN model. However, disclosed aspects are not limited to particular activation functions or small parameter changes, and some aspects can model non-linearities (including any non-linear activations) via linear approximations. ReLUs are advantageous in that the arguments of the activation function are passed in the activated state, and in the deactivated state, the zero might be implemented by discarding corresponding terms in the expanded matrix of interest.

With reference to FIG. 1A, at the input to Layer L, which comprises one or more ($N_4$) nodes, outputs $\alpha_0^{l-1}$, $\alpha_1^{L-1}, \ldots, \alpha_{N_3-1}^{L-1}$ from Layer (L-1) may be weighted, and a bias may be added, to produce input vector $z^L$, comprising $z_0^L, z_1^L, \ldots, z_{N_4-1}^L$, such as represented by:

$$\begin{bmatrix} z_0^L \\ z_1^L \\ \vdots \\ z_{N_4-1}^L \end{bmatrix} = \begin{bmatrix} w_{0,0}^L & w_{0,1}^L & \cdots & w_{0,N_3-1}^L \\ w_{1,0}^L & w_{1,1}^L & \cdots & w_{1,N_3-1}^L \\ \vdots & \vdots & \ddots & \vdots \\ w_{N_4-1,0}^L & w_{N_4-1,1}^L & \cdots & w_{N_4-1,N_3-1}^L \end{bmatrix} \begin{bmatrix} a_0^{L-1} \\ a_1^{L-1} \\ \vdots \\ a_{N_3-1}^{L-1} \end{bmatrix} + \begin{bmatrix} b_0^L \\ b_1^L \\ \vdots \\ b_{N_4-1}^L \end{bmatrix}$$

Function $f_i^L$ is then performed on $z^L$ at Layer L to produce outputs $\alpha_0^L, \alpha_1^L, \ldots, \alpha_{N_4-1}^L$. An error function (sometimes referred to as loss or cost) can be computed for each value of the output vector $\alpha^L$, and a total loss or cost function can be computed from the set of computed errors. Disclosed aspects can provide for computationally efficient updates to inputs $z^L$ of Layer L, the outputs $\alpha^L$ of Layer L, the computed errors (e.g., $\hat{y}_i - y_i$), and/or the total cost. Note that Layer L can be inferred to be a hidden layer or an output layer of the ANN.

In accordance with aspects of the disclosure, vector $z^L$, disregarding the bias, can be expanded to a matrix form, $Z^L$, such as:

$$\begin{bmatrix} Z_{0,0}^L & Z_{0,1}^L & \cdots & Z_{0,N_3-1}^L \\ Z_{1,0}^L & Z_{1,1}^L & \cdots & Z_{1,N_3-1}^L \\ \vdots & \vdots & \ddots & \vdots \\ Z_{N_4-1,0}^L & Z_{N_4-1,1}^L & \cdots & Z_{N_4-1,N_3-1}^L \end{bmatrix} =$$

$$\begin{bmatrix} w_{0,0}^L & w_{0,1}^L & \cdots & w_{0,N_3-1}^L \\ w_{1,0}^L & w_{1,1}^L & \cdots & w_{1,N_3-1}^L \\ \vdots & \vdots & \ddots & \vdots \\ w_{N_4-1,0}^L & w_{N_4-1,1}^L & \cdots & w_{N_4-1,N_3-1}^L \end{bmatrix} \begin{bmatrix} a_0^{L-1} & 0 & \cdots & 0 \\ 0 & a_1^{L-1} & & \vdots \\ \vdots & & \ddots & 0 \\ 0 & \cdots & 0 & a_{N_3-1}^{L-1} \end{bmatrix} =$$

$$\begin{bmatrix} w_{0,0}^L a_0^{L-1} & w_{0,1}^L a_1^{L-1} & \cdots & w_{0,N_3-1}^L a_{N_3-1}^{L-1} \\ w_{1,0}^L a_0^{L-1} & w_{1,1}^L a_1^{L-1} & \cdots & w_{1,N_3-1}^L a_{N_3-1}^{L-1} \\ \vdots & \vdots & \ddots & \vdots \\ w_{N_4-1,0}^L a_0^{L-1} & w_{N_4-1,1}^L a_1^{L-1} & \cdots & w_{N_4-1,N_3-1}^L a_{N_3-1}^{L-1} \end{bmatrix}$$

wherein weight matrix $W^L$ operates on the expanded matrix $A^{L-1}$, whose diagonal elements are the Layer (L-1) output values, e.g., $\alpha_0^{L-1}, \ldots, \alpha_{N_3-1}^{L-1}$. The vector $z^L$, which may or may not include the bias, can be obtained by summing the elements in each row of $Z^L$. In some aspects, the bias terms can be employed in the conversion of the activation functions to linear approximations.

By way of example, for each row of the matrix $Z^L$, the terms are summed and a bias term $b_i^L$ corresponding to each row is added to the sums, and then the Layer L activation function $f_i^L$ can be performed on the sum to produce an activation, or output. In some of the aspects disclosed herein, activation functions can be implemented using a recursion function. In some of the disclosed aspects, the activation function can be implemented via scalar multipliers $g_i^L$ applied to the vector $z^L$. Thus, a bias $b_i^L$ can be implemented to change or adapt the corresponding activation scaling term $g_i^L$. In some aspects, the scalar multipliers may be computed using a recursion function. The scalar multipliers can be employed in an expanded-form scaling matrix $G^L$. The output of Layer L is the expanded matrix $A^L$:

$$\begin{bmatrix} a_{0,0}^L & a_{0,1}^L & \cdots & a_{0,N_3-1}^L \\ a_{1,0}^L & a_{1,1}^L & \cdots & a_{1,N_3-1}^L \\ \vdots & \vdots & \ddots & \vdots \\ a_{N_4-1,0}^L & a_{N_4-1,1}^L & \cdots & a_{N_4-1,N_3-1}^L \end{bmatrix} =$$

$$\begin{bmatrix} g_0^L & 0 & \cdots & 0 \\ 0 & g_1^L & & \vdots \\ \vdots & & \ddots & 0 \\ 0 & \cdots & 0 & g_{N_4-1}^L \end{bmatrix} \begin{bmatrix} Z_{0,0}^L & Z_{0,1}^L & \cdots & Z_{0,N_3-1}^L \\ Z_{1,0}^L & Z_{1,1}^L & \cdots & Z_{1,N_3-1}^L \\ \vdots & \vdots & \ddots & \vdots \\ Z_{N_4-1,0}^L & Z_{N_4-1,1}^L & \cdots & Z_{N_4-1,N_3-1}^L \end{bmatrix} =$$

$$\begin{bmatrix} g_0^L w_{0,0}^L a_0^{L-1} & g_0^L w_{0,1}^L a_1^{L-1} & \cdots & g_0^L w_{0,N_3-1}^L a_{N_3-1}^{L-1} \\ g_1^L w_{1,0}^L a_0^{L-1} & g_1^L w_{1,1}^L a_1^{L-1} & \cdots & g_1^L w_{1,N_3-1}^L a_{N_3-1}^{L-1} \\ \vdots & \vdots & \ddots & \vdots \\ g_{N_4-1}^L w_{N_4-1,0}^L a_0^{L-1} & g_{N_4-1}^L w_{N_4-1,1}^L a_1^{L-1} & \cdots & g_{N_4-1}^L w_{N_4-1,N_3-1}^L a_{N_3-1}^{L-1} \end{bmatrix}$$

In some aspects, one or more columns or rows of zeroes may be added to the expanded matrix $Z^L$ to satisfy the necessary matrix dimension requirements of the multiplication of $G^L$ with $Z^L$. Similarly, zero insertion can be effected in the examples throughout this disclosure to achieve the necessary matrix dimensions for the operations disclosed herein.

If an updated $z_i^L$ at node i is determined to be within a predetermined threshold, the activation $f_i^L$ of the updated $z_i^L$ can be approximated using a linear model, possibly with respect to a previous activation. For example, the scalar multiplier $g_i^L$ corresponding to a previous $z_i^L$ can be used for the linear approximation of the activation function applied to the updated $z_i^L$. When the updated $z_i^L$ exceeds the threshold, the corresponding scalar multiplier $g_i^L$ can be updated. In some aspects, this can include recomputing $g_i^L$ using a recursive function. The model can employ a linear update to effect the update to $g_i^L$. The model update may employ an additive update. For example, an additive update $\Delta g_0^L$ can be used in the expanded matrix format employed in the model. The model update may employ a multiplicative update. For example, a scaling update $\alpha_i^L$ to $g_i^L$ to produce an updated $g_i^L$ can multiply corresponding elements in rows or columns of the model's expanded-matrix form.

Changes to bias $b_i^L$, weights $W^L$, and activations (e.g., $\alpha_i^{L-1}$) from previous layers can affect the values $z_i^L$, and thus, the activation function $f_i^L$. Disclosed aspects can provide for tracking such changes to $z_i^L$, such as in the affected nodes of forward layers, and provide for updating $g_i^L$ in those nodes as necessary. If at a given node, the update from a previous layer is scaled by a small amount (e.g., a weight that is close to zero, or below a threshold value), the evaluation of the update's effect on the activation can be skipped. The activation function and/or the activation scaling weights $g_i^L$ can be updated using recursive relationships, such as recursion functions. It should be appreciated that additive or multiplicative updates may be made to parameters described herein.

In some aspects, at each node where the argument of the activation function changes due to an update to one of the model's parameters, the change in the argument can be computed and compared to at least one threshold value in order to determine if the linear approximation of the activation function needs to be updated. If necessary, the update to the activation scaling weight $g_i^L$ can be made, followed by a corresponding linear update to the network model.

In one example, an update to activation scaling weight $g_0^L$ is implemented as a multiplicative (e.g., scaling) update or an additive update to row "0" of column vector $a^L$ or expanded matrix $A^L$. Alternatively, the update to an error, loss or cost can be computed. In some aspects, the error, loss or cost is implemented functionally using an expanded-matrix format. In some aspects, this may be computed as an update to a previously computed error corresponding to row "0". In one example, an update to a weight (e.g., $w_{0,0}^L$) updates a particular element (e.g., 0,0) in $A^L$. This can be implemented as a scaling update or an additive update to row "0" of column vector $a^L$ or element (0,0) of expanded matrix $A^L$. In some aspects, this may be computed as an update to a previously computed error corresponding to row "0". In one aspect, an update of a previous layer's (e.g., layer L-1) activation (e.g., $\alpha_0^{L-1}$) updates a particular column (e.g., column 0) in $A^L$. This can be implemented as a column update to $A^L$ or an additive update to vector $a^L$. In some aspects, this may be computed as an update to each previously computed error.

In some aspects, a node's activation function may be turned off, effectively eliminating the node, which zeros the node's outputs. In some aspects, this models removal of the node. In other aspects, this can model the zero-output state of a ReLU activation. Thus, the effect of zeroing the node may be computed as one or more linear updates to the model by removing or ignoring corresponding values in the model's expanded matrix. In some aspects, a change to input data to the ANN can be modeled as a linear update.

In an exemplary aspect, an update to $\alpha_0^{L-1}$ can be represented as $\alpha_0^{L-1}(u) = \alpha_0^{L-1} + \Delta\alpha_0^{L-1}$. The update can be represented as:

$$\Delta A^L = \begin{bmatrix} g_0^L w_{0,0}^L \Delta a_0^{L-1} & 0 & \cdots & 0 \\ g_1^L w_{1,0}^L \Delta a_0^{L-1} & 0 & \cdots & 0 \\ \vdots & \vdots & \ddots & \vdots \\ g_{N_4-1}^L w_{N_4-1,0}^L \Delta a_0^{L-1} & 0 & \cdots & 0 \end{bmatrix}$$

which can be implemented as an additive update to an (initial or previous) $A^L(0)$ to produce an updated expanded matrix $A^L(u)$. Alternatively, the non-zero elements in each row of $\Delta A^L$ can be summed to produce update column vector $\Delta a^L$, which can be added to (initial or previous) column vector $a^L(0)$ to provide an updated column vector $a^L(u)$. In some aspects, column vector $\Delta a^L$ can be used to compute gradients. Updates to the network's parameters can be implemented as simple bit operations applied to values (represented here by expanded-matrix format) stored in memory from one or more previous iterations.

Such techniques can be adapted to providing linear updates to $Z^L$, for example. Network updates due to updated weights and/or biases may be provided (and adapted as necessary) in a similar manner as described herein. It should be appreciated that such techniques can be adapted to updates that were made to parameters in earlier (i.e., previous) layers, and multiple layers of the ANN (and their updates) can be modeled via one or more linear approximations.

In one aspect, $\Delta Z^L$ resulting from $+\Delta\alpha_0^{L-1}$ is computed:

$$\Delta Z_L = \begin{bmatrix} w_{0,0}^L \Delta a_0^{L-1} & 0 & \cdots & 0 \\ w_{1,0}^L \Delta a_0^{L-1} & 0 & \cdots & 0 \\ \vdots & \vdots & \ddots & \vdots \\ w_{N_4-1,0}^L \Delta a_0^{L-1} & 0 & \cdots & 0 \end{bmatrix}$$

And the updated $z^L$ values at each node in layer L can be compared to threshold values or breakpoints to determine if the argument of each activation function has changed sufficiently to require an update to the corresponding (i) activation scaling weight $g_i^L$. The model update can be made with respect to the Layer L activation, error, loss or cost.

Figure 5:
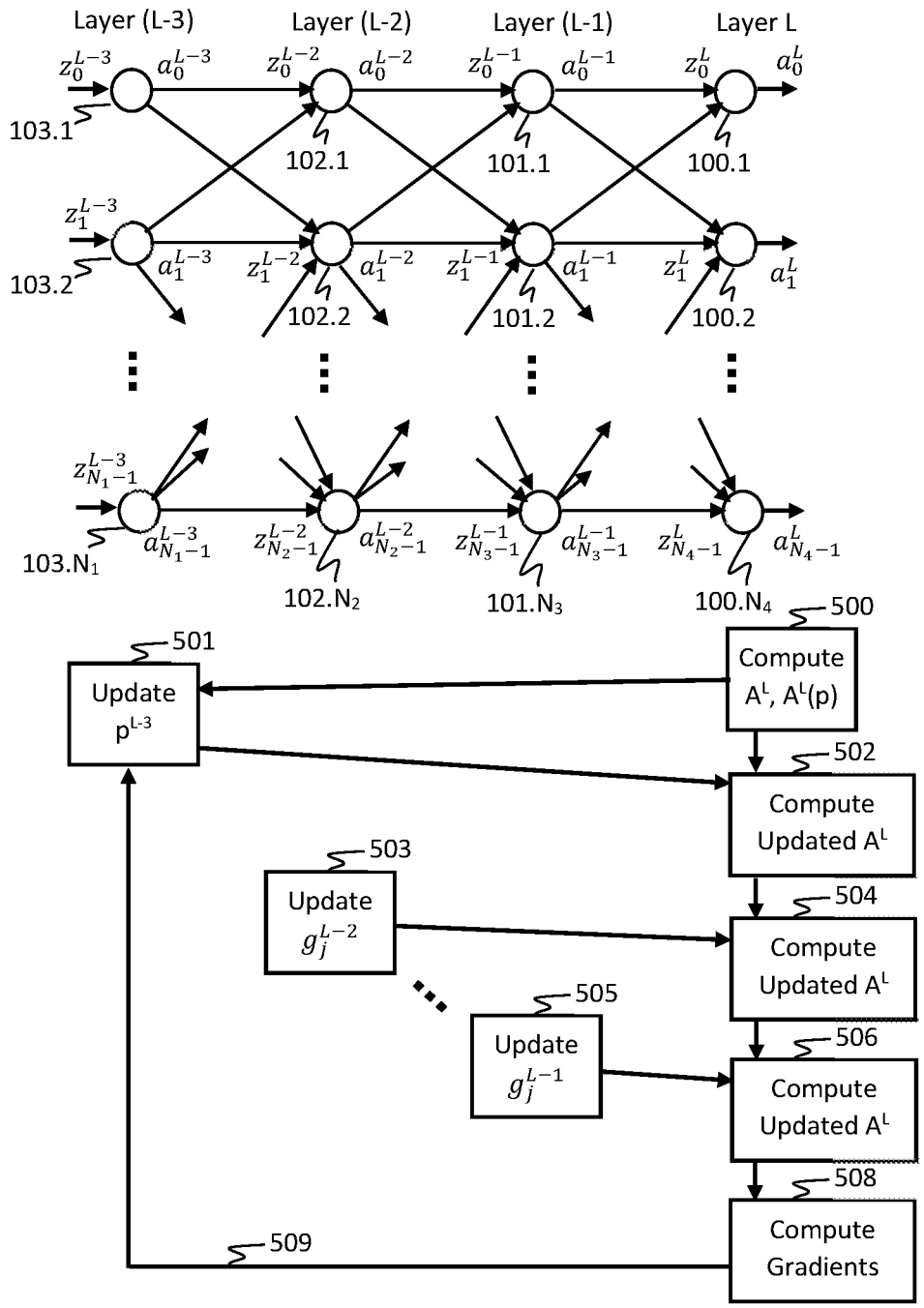
FIG. 5 is a flow diagram shown with respect to layers of an ANN that depicts aspects in which expanded matrices can be used in combination with linear updates in an ANN.

FIG. 5 illustrates aspects in which expanded matrices can be used in combination with linear updates in an ANN. One or more expanded matrices can be computed 500 for Layer L based on parameters at Layer L-3. An update 501 to one or more parameters in Layer L-3 may be made. For example, parameter updates may be based on gradient computations (e.g., 508). The update 501 may comprise updates to one or more activation scaling factors $g_j^{L-3}$ in Layer L-3. The expanded matrix (or matrices) can be updated 502 based on the parameter updates 501.

In Layer L-2 (and subsequent layers), the updates to arguments z are evaluated at each node as part of a scaling-factor update process 503, 505. If the update to z is determined to be zero or negligible (e.g., below a threshold value) at a particular node, the evaluation may be skipped, and no update to that node's activation scaling factor is made. In nodes that pass the evaluation, the update to z is evaluated to determine if an update 503, 505 to each node's activation scaling factor is to be made. An update 503, 505 to an activation scaling factor can be followed by a corresponding update to the expanded matrix 504, 506, respectively. After all the updates are computed (502, 504, 506), gradients for the Layer L-3 parameters may be computed 508, which can be returned 509 to the update 501 to compute new parameter updates.

The following example illustrates how the methods and apparatuses described with respect to FIG. 5 may be practiced. In this example, the number of nodes in each layer $N_L, \ldots, N_{L-3}$) is assumed to be N. Also, the following index notation of the weights is used: In $w_{i,j}^l$, index i denotes the output of node i in layer l-1, and index j denotes node j in layer l. The output of the Layer L relative to the activations of Layer L-1 is:

$$a_0^L = g_0^L(w_{0,0}^L a_0^{L-1} + \ldots + w_{N-1,0}^L a_{N-1}^{L-1})$$
$$\vdots \qquad \vdots$$
$$a_{N-1}^L = g_{N-1}^L(w_{0,N-1}^L a_0^{L-1} + \ldots + w_{N-1,N-1}^L a_{N-1}^{L-1})$$

Instead of summing the values in the brackets ( ), the addends can comprise elements of the expanded matrix $A^L$. Sparsity in both the activations and the weights results in sparsity in the expanded matrix, which can be exploited for computational, memory, and power savings. Further improvements can be realized by employing quantization, weight sharing, pruning, and/or constraining update values to a restricted set that enables simple processing steps to replace multiplication. It should be noted that the output of Layer L can be expressed with respect to any of the ANN parameters in preceding layers, such as argument z values, bias b values, activation a values, weights w, or g values.

The output $A^L$ of the Layer L relative to the activations of Layer L-3 is:

$$a_0^L = g_0^L(w_{0,0}^L g_0^{L-1}\{w_{0,0}^{L-1} g_0^{L-2}[w_{0,0}^{L-2} a_0^{L-3} + \ldots + w_{N-1,0}^{L-2} a_{N-1}^{L-3}] + $$
$$\ldots + w_{N-1,0}^{L-1} g_{N-1}^{L-2}[w_{0,N-1}^{L-2} a_0^{L-3} + \ldots + w_{N-1,N-1}^{L-2} a_{N-1}^{L-3}]\} +$$
$$\ldots + w_{N-1,0}^L g_{N-1}^{L-1}\{w_{0,0}^{L-1} g_0^{L-2}[w_{0,0}^{L-2} a_0^{L-3} + \ldots + w_{N-1,0}^{L-2} a_{N-1}^{L-3}] + $$
$$\ldots + w_{N-1,0}^{L-1} g_{N-1}^{L-2}[w_{0,N-1}^{L-2} a_0^{L-3} + \ldots + w_{N-1,N-1}^{L-2} a_{N-1}^{L-3}]\})$$
$$\vdots$$
$$a_{N-1}^L =$$
$$g_{N-1}^L(w_{0,N-1}^L g_0^{L-1}\{w_{0,0}^{L-1} g_0^{L-2}[w_{0,0}^{L-2} a_0^{L-3} + \ldots + w_{N-1,0}^{L-2} a_{N-1}^{L-3}] + \ldots + w_{N-1,0}^{L-1}$$
$$g_{N-1}^{L-2}[w_{0,N-1}^{L-2} a_0^{L-3} + \ldots + w_{N-1,N-1}^{L-2} a_{N-1}^{L-3}]\} + \ldots +$$
$$w_{N-1,N-1}^L g_{N-1}^{L-1}\{w_{0,0}^{L-1} g_0^{L-2}[w_{0,0}^{L-2} a_0^{L-3} + \ldots + w_{N-1,0}^{L-2} a_{N-1}^{L-3}] +$$
$$\ldots + w_{N-1,N-1}^{L-1} g_{N-1}^{L-2}[w_{0,N-1}^{L-2} a_0^{L-3} + \ldots + w_{N-1,N-1}^{L-2} a_{N-1}^{L-3}]\})$$

In the expression for the output $A^L$ of the Layer L, such as the expression shown above relative to the activations of Layer L-3, certain numerical computational efficiencies can be achieved, such as (but not limited to) exploiting similarities in the expression so similar products and sums are not repeated, quantizing parameter values (including setting small values to zero), enabling different parameters with the same value to share the same memory location, and/or possibly by employing parameter values from a restricted set (such as powers of two, ternary values, binary values, and the like) such that products may be implemented by bit-shifting, sign changes, skipping operations when there is a multiplication by zero, as well as others.

In one example, since each operation in the brackets $\{\cdot\}$ appears multiple times in each (i) expression for $\alpha_i^L$, and appears across the multiple $\alpha_i^L$ expressions, the numerical computation for a given expression in $\{\cdot\}$ might be performed once, and the result used wherever that expression appears. In a set of expressions (e.g., $\alpha_i^L$, or other expressions disclosed herein), operations (e.g., in the brackets $\{\cdot\}$) may be provisioned as pointers to a common memory location where a numerical value for the operation is stored. When one or more parameters in the operation are updated, the operation's corresponding numerical value is updated, and the expression(s) can be automatically updated. A parameter update may be provisioned from a restricted set, such as to update the numerical value via a simple operation (e.g., a bit shift, an additive update, and/or a sign change). In the case of a ReLU activation scaling function $g_i^l \in \{0,1\}$ update, the operation's pointer can be directed to a zero value stored in memory ($g_i^l = 0$), or to the memory location where a previously computed numerical value for the operation is stored ($g_i^l = 1$). When the set of expressions is updated accordingly, any terms (e.g., elements) that are scaled by zero (e.g., pointers to the stored zero value) can be omitted from the computation of the expression.

In one example, the expression for $\alpha_0^L$ shows that $\{\cdot\}$ is multiplied by the multipliers $g_0^L w_{0,0}^L g_0^{L-1}, \ldots, g_0^L w_{N-1,0}^L g_{N-1}^{L-1}$, and the resulting products are summed. In one aspect, the multipliers are summed, and a product of the sum with the numerical computation of $\{\cdot\}$ can be performed. In another aspect, the multipliers are selected to be from a restricted set of values such that each product of a multiplier with the numerical computation of $\{\cdot\}$ can be performed by bit shifting, changing the sign, or selecting/de-selecting (e.g., disregarding) the numerical computation of $\{\cdot\}$. With respect to $\alpha_0^L$, for example, level L-1 might employ a ReLU activation function, so $g_0^{L-1}$ is zero (which de-selects the computed value $\{\cdot\}$) or one (which has no effect on the multiplication). The weight $w_{0,0}^L$ might be selected from a set of ternary values (-1,0,1), so a value of -1 changes the sign of the computed value $\{\cdot\}$, zero omits $\{\cdot\}$, and one has no effect. Layer L might employ a tan h activation configured to be piecewise linear with parameters $g_0^L$ that are restricted to powers of two. Thus, the activation can be implemented by bit-shifting the computed value $g_0^L w_{0,0}^L g_0^{L-1}\{\cdot\}$. Aspects disclosed herein can employ or be employed in any of the expanded matrix types described herein, including (but not limited to) $A^L$ and $A^L(p)$ matrices.

In one aspect, the expanded matrix $A^L$ comprises the addends of the vector elements ($\alpha_0^L, \ldots, \alpha_{N-1}^L$). In another aspect, the expanded matrix $A^L(p)$ comprises the scaling factors of parameter(s) p. For example, $A^L(p) = A^L(P)^{-1}$, where P is a diagonal matrix of the same dimension as $A^L$, with diagonal elements (indexed by (j,j)) equal to p corresponding to column index j of $A^L$ where p occurs in $A^L$'s elements; and the other diagonal elements of P are one. The elements of $A^L$ or $A^L(p)$ may be computed numerically. The computed matrix $A^L$ may be employed in a multiplicative update, such as where an updated p comprises a scaling factor ρ that multiplies a previous p, and the scaling factor ρ is used to multiply the numerical elements of (computed matrix) $A^L$ computed from p. In another aspect, the computed elements of $A^L(p)$ that are scaling factors of p can be multiplied by a change in (i.e., update to) p, (i.e., $\Delta p$), and the product can be added to a previous computed expanded matrix, e.g., $A^L = A^L(p)P$. It should be appreciated that the parameters p can be ANN parameters from one or more of the layers.

In some aspects, elements of $A^L$ or $A^L(p)$ can be grouped by a predetermined parameter set p, and each group of elements corresponding to a particular parameter can be summed. By way of example, the elements of $A^L$ can be grouped with respect to like parameters ($\alpha_0^{L-3}, \ldots, \alpha_{N-1}^{L-3}$), and the grouped elements can be summed. In this case, the first column of $A^L$ might comprise products with $\alpha_0^{L-3}$, and the N-1$^{th}$ column of $A^L$ might comprise products with $\alpha_{N-1}^{L-3}$. $A^L$ whose elements are grouped with respect to parameters p is denoted as $A^L\{p\}$. Thus, $A^L$ whose elements are grouped with respect to ($\alpha_0^{L-3}, \ldots, \alpha_{N-1}^{L-3}$) is denoted as $A^L\{\alpha^{L-3}\}$. $A^L\{\alpha^{L-3}\}$ can be an N×N matrix. The matrix $A^L\{\alpha^{L-3}\}(\alpha^{L-3})$ denotes the expanded $A^L\{\alpha^{L-3}\}$ matrix of coefficients of ($\alpha_0^{L-3}, \ldots, \alpha_{N-1}^{L-3}$).

By way of example, elements in each row of $A^L$ that are products with $a_0^{L-3}$ (shown in bold) can be summed, and the sums can provide the elements of column 0 in $A^L$. Column 1's elements can comprise sums of elements corresponding to $\alpha_1^{L-3}$, and so on up to column (N-1)'s elements comprising sums of the elements corresponding to $\alpha_{N-1}^{L-3}$:

$$a_0^L = g_0^L(w_{0,0}^L g_0^{L-1}\{w_{0,0}^{L-1} g_0^{L-2}[w_{0,0}^{L-2} a_0^{L-3} + \ldots + w_{N-1,0}^{L-2} a_{N-1}^{L-3}] + \ldots +$$
$$w_{N-1,0}^{L-1} g_{N-1}^{L-2}[w_{0,N-1}^{L-2} a_0^{L-3} + \ldots + w_{N-1,N-1}^{L-2} a_{N-1}^{L-3}]\} + \ldots +$$
$$w_{N-1,0}^L g_{N-1}^{L-1}\{w_{0,N-1}^{L-1} g_0^{L-2}[w_{0,0}^{L-2} a_0^{L-3} + \ldots + w_{N-1,0}^{L-2} a_{N-1}^{L-3}] + \ldots +$$
$$w_{N-1,N-1}^{L-1} g_{N-1}^{L-2}[w_{0,N-1}^{L-2} a_0^{L-3} + \ldots + w_{N-1,N-1}^{L-2} a_{N-1}^{L-3}]\})$$

$$\vdots$$

$$a_{N-1}^L =$$
$$g_{N-1}^L(w_{0,N-1}^L g_0^{L-1}\{w_{0,0}^{L-1} g_0^{L-2}[w_{0,0}^{L-2} a_0^{L-3} + \ldots + w_{N-1,0}^{L-2} a_{N-1}^{L-3}] + \ldots + w_{N-1,1}^{L-1}$$
$$g_{N-1}^{L-2}[w_{0,N-1}^{L-2} a_0^{L-3} + \ldots + w_{N-1,N-1}^{L-2} a_{N-1}^{L-3}]\} + \ldots +$$
$$w_{N-1,N-1}^L g_{N-1}^{L-1}\{w_{0,0}^{L-1} g_0^{L-2}[w_{0,0}^{L-2} a_0^{L-3} + \ldots + w_{N-1,0}^{L-2} a_{N-1}^{L-3}] +$$
$$\ldots + w_{N-1,N-1}^{L-1} g_{N-1}^{L-2}[w_{0,N-1}^{L-2} a_0^{L-3} + \ldots + w_{N-1,N-1}^{L-2} a_{N-1}^{L-3}]\})$$

For example, in the expression of $\alpha_0^L$, terms that comprise parameter $\alpha_0^{L-3}$ can be summed:

$$g_0^L w_{0,0}^L g_0^{L-1} w_{0,0}^{L-1} g_0^{L-2} w_{0,0}^{L-2} \alpha_0^{L-3} + \ldots +$$
$$g_0^L w_{0,0}^L g_0^{L-1} w_{N-1,0}^{L-1} g_{N-1}^{L-2} w_{0,N-1}^{L-2}$$
$$\alpha_0^{L-3} + \ldots + g_0^L w_{N-1,0}^L g_{N-1}^{L-1}$$
$$w_{0,N-1}^{L-1} g_0^{L-2} w_{0,0}^{L-2} \alpha_0^{L-3} + \ldots +$$
$$g_0^L w_{N-1,0}^L g_{N-1}^{L-1} w_{N-1,N-1}^{L-1} g_{N-1}^{L-2}$$
$$w_{0,N-1}^{L-2} \alpha_0^{L-3}$$

which can be expressed via arranging and grouping terms to produce a product of sums, such as:

$$a_0^{L-3} g_0^L w_{0,0}^L g_0^{L-1} \left( \sum_{i=0}^{N-1} w_{i,0}^{L-1} g_i^{L-2} w_{0,i}^{L-2} \right) +$$
$$\ldots + a_0^{L-3} g_0^L w_{N-1,0}^L g_{N-1}^{L-1} \left( \sum_{i=0}^{N-1} w_{i,N-1}^{L-1} g_i^{L-2} w_{0,i}^{L-2} \right) =$$
$$a_0^{L-3} g_0^L \left( \sum_{j=0}^{N-1} w_{j,0}^L g_j^{L-1} \left( \sum_{i=0}^{N-1} w_{i,j}^{L-1} g_i^{L-2} w_{0,i}^{L-2} \right) \right)$$

in the expression of $\alpha_{N-1}^L$, the element corresponding to parameter $\alpha_0^{L-3}$ can be expressed as:

$$a_0^{L-3} g_{N-1}^L \left( \sum_{j=0}^{N-1} w_{j,N-1}^L g_j^{L-1} \left( \sum_{i=0}^{N-1} w_{i,j}^{L-1} g_i^{L-2} w_{0,i}^{L-2} \right) \right)$$

The above disclosure can be generalized for different parameters. The terms in brackets (·) may appear in other expressions in elements of the expanded matrix, and possibly in other expanded matrices, so these terms can be computed once, stored, and reused where appropriate. Computations can be simplified when at least some parameters are zero and/or small enough to be approximated as zero, such as to bypass at least some products and/or sums. In some aspects, elements of $A^L$ or $A^L(p)$ can be grouped according to multiple sets of parameters.

In some aspects, an update to a parameter in one layer can cause an update to at least one parameter in a subsequent layer in the direction of propagation. An update to $\alpha_0^{L-3}$ might be made, and then the effect of the update on the argument of any activation functions in the subsequent layers can be made to determine if the approximated activation function needs to be updated 503, 505. The update 503, 505 to the approximated activation function can be implemented as a linear update 504, 506 to the corresponding numerically computed elements in $A^L$ or $A^L(p)$. For example, if it is determined that the update to $\alpha_0^{L-3}$ causes an update to $g_0^{L-1}$, e.g., $\Delta g_0^{L-1}$, the first element (column 0) in the expression of $\alpha_0^L$ can be updated with an additive update according to the expression:

$$a_0^{L-3} g_0^L w_{0,0}^L \Delta g_0^{L-1} \left( \sum_{i=0}^{N-1} w_{i,0}^{L-1} g_i^{L-2} w_{0,i}^{L-2} \right)$$

and the first element (column 0) in the expression of $\alpha_{N-1}^L$ can be updated with an additive update according to the expression:

$$a_0^{L-3} g_{N-1}^L w_{0,N-1}^L \Delta g_0^{L-1} \left( \sum_{i=0}^{N-1} w_{i,0}^{L-1} g_i^{L-2} w_{0,i}^{L-2} \right)$$

In some aspects, the above updates due to $\Delta g_0^{L-1}$ may comprise the updated value of $\alpha_0^{L-3}$. In some aspects, such as when the update to $\alpha_0^{L-3}$ is small, the above updates due to $\Delta g_0^{L-1}$ may employ a previous value of $\alpha_0^{L-3}$. Updates 504, 506 to multiple columns in $A^L$ or $A^L(p)$ can be made, as necessary. It should be appreciated that numerical computations for some expressions can be performed once and reused where the same expression appears in other elements of $A^L$ or $A^L(p)$. Products of values that are close to zero may be omitted for the purpose of simplifying the update computations, such that the improvement in computational efficiency outweighs the loss in accuracy. Similarly, summands that are close to zero may be omitted.

In another example, the update to $\alpha_0^{L-3}$ causes an update to $g_0^{L-2}$, e.g., $\Delta g_0^{L-2}$, so the first element (column 0) in the expression of $a_0^L$ can be updated with an additive update according to the expression:

$$\Delta g_0^{L-2} w_{0,0}^{L-2} a_0^{L-3} g_0^L \left( \sum_{j=0}^{N-1} w_{j,0}^L g_j^{L-1} w_{0,j}^{L-1} \right)$$

and the first element (column 0) in the expression of $\alpha_{N-1}^L$ can be updated with an additive update according to the expression:

$$\Delta g_0^{L-2} w_{0,0}^{L-2} a_0^{L-3} g_{N-1}^L \left( \sum_{j=0}^{N-1} w_{j,N-1}^L g_j^{L-1} w_{0,j}^{L-1} \right)$$

In a ReLU, there is a single breakpoint where the argument equals zero, and $\Delta g_0^{L-2} = \pm 1$.

In many aspects, the updates 504, 506 to downstream activations are an infrequent occurrence. In many aspects, the complexity of implementing such updates is dramatically reduced by virtue of many node activations being zero and/or close enough to zero to be disregarded. Network sparsity can be exploited whereby a number of synapse weights $w_{i,j}$ are zero and/or close enough to zero to be disregarded. In some aspects, where any of the multipliers are zero (or very small) in the above expressions, the corresponding multiplications can be omitted. Thus, updates might comprise only a few sums and products, and updates might be made to only a subset of the elements. Some of the nodes may be removed, which can be effected by setting the corresponding node's activation to zero.

The expanded output $A^L$ of Layer L can be represented as:

$$\begin{bmatrix} a_{0,0}^L & a_{0,1}^L & \cdots & a_{0,N-1}^L \\ a_{1,0}^L & a_{1,1}^L & \cdots & a_{1,N-1}^L \\ \vdots & \vdots & \ddots & \vdots \\ a_{N-1,0}^L & a_{N-1,1}^L & \cdots & a_{N-1,N-1}^L \end{bmatrix} = \begin{bmatrix} C_{0,0}^L & C_{0,1}^L & \cdots & C_{0,N-1}^L \\ C_{1,0}^L & C_{1,1}^L & \cdots & C_{1,N-1}^L \\ \vdots & \vdots & \ddots & \vdots \\ C_{N-1,0}^L & C_{N-1,1}^L & \cdots & C_{N-1,N-1}^L \end{bmatrix}$$

where each $C_{i,j}^L$ comprises a linear combination of ANN parameters, and the output vector $\alpha^L$ of Layer L is:

$$\begin{bmatrix} a_0^L \\ a_1^L \\ \vdots \\ a_{N-1}^L \end{bmatrix} = \begin{bmatrix} C_{0,0}^L + C_{0,1}^L +, \ldots, + C_{0,N-1}^L \\ C_{1,0}^L + C_{1,1}^L +, \ldots, + C_{1,N-1}^L \\ \vdots \\ C_{N-1,0}^L + C_{N-1,1}^L +, \ldots, + C_{N-1,N-1}^L \end{bmatrix}$$

Or equivalently, each $\alpha_i^L$ of vector $\alpha^L$ is:

$$a_i^L = \sum_{j=0}^{N-1} a_{i,j}^L$$

$A^L$ may be expressed with respect to a particular ANN parameter set, $p_j$ $$A^L = \begin{bmatrix} C_{0,0}^L(p_0) & C_{0,1}^L(p_1) & \cdots & C_{0,N-1}^L(p_{N-1}) \\ C_{1,0}^L(p_0) & C_{1,1}^L(p_1) & \cdots & C_{1,N-1}^L(p_{N-1}) \\ \vdots & \vdots & \ddots & \vdots \\ C_{N-1,0}^L(p_0) & C_{N-1,1}^L(p_1) & \cdots & C_{N-1,N-1}^L(p_{N-1}) \end{bmatrix} \begin{bmatrix} p_0 & 0 & \cdots & 0 \\ 0 & p_1 & \cdots & 0 \\ \vdots & \vdots & \ddots & \vdots \\ 0 & 0 & \cdots & p_{N-1} \end{bmatrix}$$

where each $C_{i,j}^L(p_j)$ denotes a scalar multiplier (which comprises a linear combination of ANN parameters) that multiplies parameter $p_j$, which are shown as diagonal elements of the diagonal matrix shown above. Thus, some aspects can compute the $C_{i,j}^L$ values in $A^L$ with respect to a parameter set, $p_j$, and compute an update to $A^L$ based on an update to one or more parameters, $p_j$. In one aspect, one or more of the parameters $p_j$ is an additive update $\Delta p_t$ (for example, $\Delta p_1$), and an additive update $\Delta A^L$ or $\Delta a^L$ (or an update to the error, loss or cost) might be computed from:

$$\Delta A^L = \begin{bmatrix} C_{0,0}^L(p_0) & C_{0,1}^L(p_1) & \cdots & C_{0,N-1}^L(p_{N-1}) \\ C_{1,0}^L(p_0) & C_{1,1}^L(p_1) & \cdots & C_{1,N-1}^L(p_{N-1}) \\ \vdots & \vdots & \ddots & \vdots \\ C_{N-1,0}^L(p_0) & C_{N-1,1}^L(p_1) & \cdots & C_{N-1,N-1}^L(p_{N-1}) \end{bmatrix} \begin{bmatrix} 0 & 0 & \cdots & 0 \\ 0 & \Delta p_1 & \cdots & 0 \\ \vdots & \vdots & \ddots & \vdots \\ 0 & 0 & \cdots & 0 \end{bmatrix}$$

The value of each additive update $\Delta p_j$ can be selected to simplify computations. For example, if the values $C_{i,j}^L(p_j)p_j$ were previously computed, $\Delta p_i$ can be selected to be a product with some $10^{-n}$ (where n is some integer) for example, which can be implemented via a shift in the decimal point of each of the previously computed values $C_{i,j}^L(p_j)p_j$. In some aspects, $\Delta p_j$ can take the form $2^{-n}$, which can be computed via bit shifts on each of the previously computed values $C_{i,j}^L(p_j)p_j$. Parameters, such as weights and/or piecewise linear approximations of the activation functions, can be quantized to provide for $10^{-n}$ or $2^{-n}$ steps, for example.

In some aspects, one or more of the parameters $p_j$ is updated via a scaling factor $\alpha_i$. (for example, scaling factor $\alpha_1$ that multiplies parameter $p_1$. The parameters, such as weights and/or piecewise linear approximations of the activation functions, can be quantized to provide for $10^{-n}$ or $2^{-n}$ steps in the scaling factor $\alpha_i$, for example, such as to provide the advantages described above. The updated $A^L$ can be expressed as:

$$A^L(u) = \begin{bmatrix} C_{0,0}^L(p_0) & C_{0,1}^L(p_1) & \cdots & C_{0,N-1}^L(p_{N-1}) \\ C_{1,0}^L(p_0) & C_{1,1}^L(p_1) & \cdots & C_{1,N-1}^L(p_{N-1}) \\ \vdots & \vdots & \ddots & \vdots \\ C_{N-1,0}^L(p_0) & C_{N-1,1}^L(p_1) & \cdots & C_{N-1,N-1}^L(p_{N-1}) \end{bmatrix}$$

$$\begin{bmatrix} p_0 & 0 & \cdots & 0 \\ 0 & \alpha_1 p_1 & \cdots & 0 \\ \vdots & \vdots & \ddots & \vdots \\ 0 & 0 & \cdots & p_{N-1} \end{bmatrix}$$

or, with respect to a previously computed $A^L$, $$= \begin{bmatrix} a_{0,0}^L & a_{0,1}^L & \cdots & a_{0,N-1}^L \\ a_{1,0}^L & a_{1,1}^L & \cdots & a_{1,N-1}^L \\ \vdots & \vdots & \ddots & \vdots \\ a_{N-1,0}^L & a_{N-1,1}^L & \cdots & a_{N-1,N-1}^L \end{bmatrix} \begin{bmatrix} 1 & 0 & \cdots & 0 \\ 0 & \alpha_1 & \cdots & 0 \\ \vdots & \vdots & \ddots & \vdots \\ 0 & 0 & \cdots & 1 \end{bmatrix}$$

In some aspects, the gradients $$\frac{\partial A^L}{\partial p} \left( \text{or } \frac{\partial a^L}{\partial p} \right)$$

can be computed, such as $$\frac{\partial A^L}{\partial p_1} = \begin{bmatrix} C_{0,0}^L(p_0) & C_{0,1}^L(p_1) & \cdots & C_{0,N-1}^L(p_{N-1}) \\ C_{1,0}^L(p_0) & C_{1,1}^L(p_1) & \cdots & C_{1,N-1}^L(p_{N-1}) \\ \vdots & \vdots & \ddots & \vdots \\ C_{N-1,0}^L(p_0) & C_{N-1,1}^L(p_1) & \cdots & C_{N-1,N-1}^L(p_{N-1}) \end{bmatrix} \begin{bmatrix} 0 & 0 & \cdots & 0 \\ 0 & 1 & \cdots & 0 \\ \vdots & \vdots & \ddots & \vdots \\ 0 & 0 & \cdots & 0 \end{bmatrix}$$

In one example, the update to $\alpha^L$ due to additive update $\Delta w_{0,0}^{L-1}$ can be computed as:

$$a^L = \begin{bmatrix} a_0^L \\ a_1^L \\ \vdots \\ a_{N-1}^L \end{bmatrix} + \Delta w_{0,0}^{L-1} \begin{bmatrix} C_{0,0}^L(w_{0,0}^{L-1}) \\ C_{1,0}^L(w_{0,0}^{L-1}) \\ \vdots \\ C_{N-1,0}^L(w_{0,0}^{L-1}) \end{bmatrix}$$

$$= \begin{bmatrix} a_0^L \\ a_1^L \\ \vdots \\ a_{N-1}^L \end{bmatrix} + g_0^{L-1} a_0^{L-2} \Delta w_{0,0}^{L-1} \begin{bmatrix} g_0^L w_{0,0}^L \\ g_1^L w_{1,0}^L \\ \vdots \\ g_{N-1}^L w_{N-1,0}^L \end{bmatrix}$$

Alternatively, multiplicative updates can be employed.

In other aspects, the above descriptions can be adapted to update the ANN model with respect to parameters at layer L-2, L-3, etc. These updates can be made with respect to changes to any of the parameters $g_j^{L-2}$, $w_{i,j}^{L-2}$, $b_j^{L-2}$ and/or $z_j^{L-2}$. Similarly, the model updates can be made with respect to changes to any of the L-3 parameters $\alpha_j^{L-3}$, $g_j^{L-3}$, $w_{i,j}^{L-3}$, $b_j^{L-3}$ and/or $z_j^{L-3}$. As in the case of L-2, $A^L$ can be expressed with respect to L-3 parameters, such as $\alpha_j^{L-2}$:

$$A^L = \begin{bmatrix} C_{0,0}^L(a_0^{L-3}) & C_{0,1}^L(a_1^{L-3}) & \cdots & C_{0,N-1}^L(a_{N-1}^{L-3}) \\ C_{1,0}^L(a_0^{L-3}) & C_{1,1}^L(a_1^{L-3}) & \cdots & C_{1,N-1}^L(a_{N-1}^{L-3}) \\ \vdots & \vdots & \ddots & \vdots \\ C_{N-1,0}^L(a_0^{L-3}) & C_{N-1,1}^L(a_1^{L-3}) & \cdots & C_{N-1,N-1}^L(a_{N-1}^{L-3}) \end{bmatrix}$$

$$\begin{bmatrix} a_0^{L-3} & 0 & \cdots & 0 \\ 0 & a_1^{L-3} & \cdots & 0 \\ \vdots & \vdots & \ddots & \vdots \\ 0 & 0 & \cdots & a_{N-1}^{L-3} \end{bmatrix}$$

Disclosed aspects can employ any of the $C_{i,j}^L$, $\{i,j=1, \ldots, N\}$, in a similar manner with respect to their corresponding parameters. The derivatives can be employed for selecting corresponding parameter updates.

In one aspect, a change in the slope of a non-linear activation function in an ANN can be implemented as an update to the linear-approximation model of the ANN. For example, at node 0 in Layer (L-1), an update to the activation function $f_0^{L-1}(z_0^{L-1})$, e.g., such as may be due to a change in $z_0^{L-1}$, can be modeled as an update to an activation function's scaling factor, $g_0^{L-1}$, or the node's output, $\alpha_0^{L-1}=g_0^{L-1}(z_0^{L-1})$. In accordance with some aspects of the disclosure, accounting for the nonlinear behavior of $f_0^{L-1}$ can be implemented as an update to the linear model, such as expressed by a matrix $A^L$, and the update can comprise a scaling of, or additive update to, a column in $A^L$. Alternatively, the update can be implemented as an additive update to the output vector $a^L$. As the activation functions are being approximated as linear or piecewise linear functions, and a linear model is used to compute the gradients, this can enable nonlinear activation functions that are not easily differentiable to be used in ANNs.

If $f_0^{L-1}$ is a ReLU, the activation function can transition from linear (e.g., slope=1) to zero (e.g., deactivated). Thus, $g_0^{L-1}$ can be updated to zero. This update has the effect of removing column 0 from $A^L$, and can be implemented in various ways, including explicitly removing column 0 from $A^L$, skipping multiplications and/or additions of values from column 0, or by performing an additive update to $a^L$ or the errors, for example. Similarly, a node can be removed, or turned off, such as by setting its activation scaling factor or output to zero, or by zeroing corresponding weights in the next layer.

Considering Layer (L-1), vector $z^{L-1}$ can be expanded to $Z^{L-1}$, such as:

$$\begin{bmatrix} Z_{0,0}^{L-1} & Z_{0,1}^{L-1} & \cdots & Z_{0,N-1}^{L-1} \\ Z_{1,0}^{L-1} & Z_{1,1}^{L-1} & \cdots & Z_{1,N-1}^{L-1} \\ \vdots & \vdots & \ddots & \vdots \\ Z_{N-1,0}^{L-1} & Z_{N-1,1}^{L-1} & \cdots & Z_{N-1,N-1}^{L-1} \end{bmatrix} = \begin{bmatrix} w_{0,0}^{L-1} & w_{0,1}^{L-1} & \cdots & w_{0,N-1}^{L-1} \\ w_{1,0}^{L-1} & w_{1,1}^{L-1} & \cdots & w_{1,N-1}^{L-1} \\ \vdots & \vdots & \ddots & \vdots \\ w_{N-1,0}^{L-1} & w_{N-1,1}^{L-1} & \cdots & w_{N-1,N-1}^{L-1} \end{bmatrix}$$

$$\begin{bmatrix} a_0^{L-1} & 0 & \cdots & 0 \\ 0 & a_1^{L-1} & \cdots & \vdots \\ \vdots & & \ddots & 0 \\ 0 & \cdots & 0 & a_{N-1}^{L-1} \end{bmatrix} = \begin{bmatrix} w_{0,0}^{L-1} a_0^{L-2} & w_{0,1}^{L-1} a_1^{L-2} & \cdots & w_{0,N-1}^{L-1} a_{N-1}^{L-2} \\ w_{1,0}^{L-1} a_0^{L-2} & w_{1,1}^{L-1} a_1^{L-2} & \cdots & w_{1,N-1}^{L-1} a_{N-1}^{L-2} \\ \vdots & \vdots & \ddots & \vdots \\ w_{N-1,0}^{L-1} a_0^{L-2} & w_{N-1,1}^{L-1} a_1^{L-2} & \cdots & w_{N-1,N-1}^{L-1} a_{N-1}^{L-2} \end{bmatrix}$$

wherein weight matrix $W^{L-1}$ operates on the expanded matrix $A^{L-2}$, whose diagonal elements are the Layer (L-2) output values, e.g., $\alpha_0^{L-2}, \ldots, \alpha_N^{L-2}$. The vector $z^{L-1}$ can be obtained by summing the elements in each row of $Z^{L-1}$.

In one aspect, in layer L-1, a change to the argument $z_i^{L-1}$ of an $i^{th}$ node's activation function due to a change in the $j^{th}$ output value $\alpha_j^{L-2}$ is computed as the change in the value in the $j^{th}$ column of the $i^{th}$ row of $Z^{L-1}$. The change in $\alpha_j^{L-2}$ is scaled by weight $w_{i,j}^{L-1}$. In another aspect, in layer L-1, a change to the argument $z_i^{L-1}$ of an $i^{th}$ node's activation function due to a change in the weight $w_{i,j}^{L-1}$ is computed as the change in the value in the $j^{th}$ column of the $i^{th}$ row of $Z^{L-1}$. The change in weight $w_{i,j}^{L-1}$ is scaled by $\alpha_j^{L-2}$. The change or the updated argument $z_i^{L-1}$ can be compared to one or more threshold values to decide if the $i^{th}$ node's $g_i^{L-1}$ should be updated. In some aspects, $g_i^{L-1}$ is updated based on a change in the bias.

The expansion of $z_i^{L-1}$ terms can be employed, and each $C_{i,j}^L$ term in $A^L$ will be expanded to up to N terms with respect to layer L-1, and the resulting expression for $A^L$ can be denoted as $A^L(L-1)$. Similar increases in the number of terms in $A^L$ occurs with each subsequent layer expansion (e.g., layer L-2, layer L-3) in $A^L$. However, the number of additional non-zero terms due to an expansion can be significantly reduced by exploiting sparsity in nodes and/or weights.

In some aspects, only a subset of the columns in $A^L$ may be employed for computing gradients and/or updates, and that subset is further reduced with sparsity. In one example, the gradient with respect to the activation function, $$\frac{\delta A^L}{\delta g_1^{L-2}}$$

can be computed by expressing $\alpha_1^{L-2}$ as a function of $g_1^{L-2}$ in $A^L(L-1)$. In one example, a change in bias $b_1^{L-2}$ may cause a change in $g_1^{L-2}$, which can be computed from $f_1^{L-2}(z_1^{L-2}+b_1^{L-2})$, such as via a recursion function that computes the activation function or the slope of the activation. From this, a linear approximation of $$\frac{\delta g_0^{L-2}}{\delta b_1^{L-2}}$$

may be computed. Then $$\frac{\delta A^L}{\delta b_1^{L-2}}$$

can be computed from $$\frac{\delta A^L}{\delta b_1^{L-2}} = \frac{\delta g_1^{L-2}}{\delta b_1^{L-2}} \cdot \frac{\delta A^L}{\delta g_1^{L-2}}.$$

Also, the derivative of $A^L$ with respect to any of the weights can be computed. In some aspects, $$\frac{\delta A^L}{\delta w_{i,j}^{L-2}}$$

computed from $A^L$ can comprise a single column. The derivatives of $a^L$ with respect to any of the parameters can be derived by summing the rows of the corresponding derivatives of $A^L$. Furthermore, the derivatives of the errors and/or the derivatives of the total cost with respect to each parameter can be derived from corresponding derivatives of $\alpha^L$.

FIG. 1C is a flow diagram that illustrates some method and apparatus aspects configured in accordance with aspects of the disclosure. Data preprocessing 111 can be performed before weight initialization 112. A forward pass 113 through the network may include batch norm processing 114. A total cost may be computed 115, and ANN parameters can be updated 116. A loop may be performed to repeat a process from 113 to 116 until one or more criteria are met.

The disclosed ANNs can include any type of sensor(s) for providing input data to the ANNs. Sensors can comprise optical sensors (such as still-image and/or video cameras, photovoltaic arrays, LIDARs, spectrometers, infrared receivers, etc.), acoustic sensors (such as microphones, piezoelectric sensors, etc.), electromagnetic sensors (e.g., Radars, radio receivers, microwave receivers, millimeter-wave receivers, spectrum analyzers, etc.), any type of environment sensor (e.g., thermometers, barometers, anemometers, seismometers, hygrometer, rain gauges, CBRN (chemical, biological, radiological, nuclear) detection equipment), etc.), reference signal generators (e.g., clocks, pilot signal generators, other reference signal generators and reference signal receivers), industrial and manufacturing process sensors, and/or any type of situational awareness sensors and systems (e.g., accelerometer, inclinometer, inertial sensor, orientation sensor, speedometer, altimeter, primary flight displays (PFDs), flight management systems (FMS), collision avoidance systems (CAS), air traffic control (ATC) systems, navigation systems (e.g., pointing, navigation, and timing receivers), gyroscope, tachometer, oil pressure gauge, fuel gauge, etc.).

In some aspects, disclosed ANNs can be configured for communications and/or network control for supporting communications. ANN output data can comprise synthesized signals for transmission in a communication channel, received user and/or control data produced from analyses of received signals, and/or network management information, such as may be produced from any combination of channel state information and network performance measurements. The network management information can comprise resource scheduling for one or more user equipments (UEs), layer mapping, UE multiple access schemes, spectrum sharing, transmission control protocols, processor load balancing across network devices (possibly including UEs), routing, antenna array processing (such as spatial multiplexing, diversity transmission, diversity reception, interference excision, antenna selection, power distribution, etc.), managing network latency, prioritizing communications, maintaining Quality of Service, disseminating channel state information and/or network performance information, provisioning network security protocols, performing network intrusion detection, threat assessment, threat mitigation, modulation and coding control, provisioning virtual machines, provisioning network services, and/or provisioning processors, memory, software, and network communication channels for services, processes, applications, sub-networks, and UEs. Input data to disclosed ANNs can comprise channel state information (such as multipath channel models, network coverage models, SNR measurements, bit-error-rate, spectrum analysis, spectrum use statistics, pilot signal measurements, and the like), network control information (such as network loads, queue backlogs, demand topology, geographical distribution of UEs, geographical distribution of server-side network devices (e.g., GnodeB's, relays, repeaters, gateways, routers), link latency, link reliability, etc.), requests for retransmission, error measurements, and network configuration), network security information (e.g., device behavior, attack vectors, malware detection, protocol manipulation detection, authentication failures, intrusion detection statistics, device trustworthiness, etc.), and/or signal-processing analyses pertaining to local signal synthesis and/or analysis, such as peak-to-average power (PAPR), MIMO condition number, principle component analysis, independent component analysis, etc.

Data may be preprocessed 111 and input for training, testing, or online run. Data normalization may be employed, such as to normalize training and test sets. Data augmentation may be employed to increase the size of the training set. The data can be formatted for batch or mini-batch processing. A subset of training examples can be used in each mini-batch. Each mini-batch might be processed on a different processor. Various pipelined and parallel-computing architectures may be employed. Each mini-batch produces a corresponding ANN output Y.

If the mini-batch size is m, then a batch gradient descent may be performed wherein all the examples are processed before each parameter update. If the mini-batch size is 1, this is a Stochastic gradient descent, wherein every training example is its own mini-batch. Mini-batch size can depend on the size of the training set and the size of memory. Mini-batch size may be set to a power of two for optimal processing efficiency.

In one aspect, forward propagation 113 to cost computation 115 is performed for each mini-batch. Parameter update 116 can include computing gradients of the cost, and updating the parameters based on the gradients and learning rate. One pass through the training set is referred to as one epoch. The learning rate may decay with respect to a function of the number of epochs. This decay rate is a hyperparameter that can be tuned.

Disclosed aspects can employ supervised learning, such as with structured data or unstructured data. During a learning phase, input data x may comprise labeled data. For example, input data x may be paired with actual (e.g., labeled, true) output y. An input feature vector x of length $N_x$ ($x \in \mathbb{R}^{N_x}$) is constructed for each training set. Supervised learning can employ offline data and/or online data. For offline data, a number m of training sets $\{(x^{(1)}y^{(1)}), \ldots, (x^{(m)},y^{(m)})\}$ is precomputed. For online data, the actual output y can be computed for each input x. In aspects wherein a linear model computes y from x, partial update methods and/or expanded matrix methods can be employed to simplify computational processing for calculating y. Because training is iterative, algorithms that speed up computations are important. Thus, disclosed aspects can be configured to approximate nonlinear systems as linear systems, and then exploit simplifying linear computational processing to speed up computations.

In weight initialization 112, the ANN's parameters (e.g., synapse weights and biases) are initialized before training. The weights can be initialized randomly, but the bias doesn't need to be initialized randomly. A weight matrix w corresponding to a particular layer l has dimension i×j, where i is the number of nodes in the layer l, and j is the number of inputs to each node. If some nodes have fewer inputs than others, the weight matrix w can be a sparse matrix. A corresponding bias vector has dimension i×1. Initialization can comprise setting the variance of random initialization weights based on the type of activation function employed at each node.

The forward pass 113 produces a prediction set $\hat{y}^{(i)}$ that is compared to the actual, or true label $y^{(1)}$ (indicated here for an $i^{th}$ training set) to produce an error, or loss. At each node in each (l) hidden layer, the output from the previous layer is weighted and summed, and a bias may be added:

$$z_1^{[l](1)} = (w_1^{[l](1)})^T a^{[l-1](1)} + b_1^{[l]}, z_2^{[l](1)} = (w_2^{[l](1)})^T a^{[l-1](1)} + b_2^{[l]}, \ldots, z_N^{[l](1)} = (w_N^{[l](1)})^T a^{[l-1](1)} + b_N^{[l]}$$

where [l] denotes layer l, (1) denotes the first training example (and subsequent training examples might be denotes by 2, ..., m), and the subscript denotes the node in the layer l. Then an activation function $f(\cdot)$ at each node can be performed on the corresponding sum:

$$\alpha_1^{[l](1)} = f(z_1^{[l](1)}), \alpha_2^{[l](1)} = f(z_2^{[l](1)}), \ldots, \alpha_N^{[l](1)} = f(z_N^{[l](1)})$$

Disclosed aspects can employ scaling terms $g_i^l$ to provide linear approximations of the activation function $f(\cdot)$, and which can be configured to operate separately on each component of $z_i^l$.

Figure 4C:
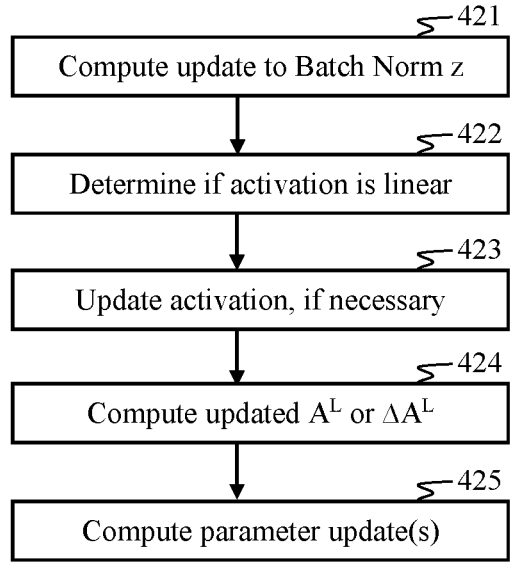

Batch norm 114 may be employed. For example, in a hidden layer, $z^{[l]}$ can be computed from inputs (activations) $a^{[l-1]}$ and weights $w^{[l]}$, and then batch norm parameters $\beta^{[l]}$ and $\gamma^{[l]}$ can be employed to compute the batch norm $z^{[l]}_{BN}$ (the mean- and variance-normalized $z^{[l]}$) from $z^{[l]}$, followed by performing the activation function. Thus, the parameters for each layer can be $w^{[l]}$, $\beta^{[l]}$, and $\gamma^{[l]}$, where $\beta$ is different than the hyperparameter $\beta$ used for momentum. In one aspect, batch norm can be implemented in the following steps shown in FIG. 4C:
 1. Compute the mean $$\mu = \frac{1}{m}\sum_i z^{(i)},$$

2. compute the variance $$\sigma^2 = \frac{1}{m}\sum_i (z^{(i)} - \mu)^2,$$

3. compute the norm $$z^{(i)}_{norm} = \frac{z^{(i)} - \mu}{\sqrt{\sigma^2 + \varepsilon}},$$

where $\varepsilon$ is a small constant that accounts for $\sigma=0$,
 4. compute $z^{[l](i)}_{BN} = \gamma^{[l]} z^{[l](i)}_{norm} + \beta^{[l]}$, where $\beta^{[l]}$ and $\gamma^{[l]}$ are learnable parameters. The variance might be adaptable, and can differ for different activation functions, or for other purposes.
 5. Compute $\Delta z^{[l](i)}_{BN}$ (based on the above steps, for one parameter updates at a previous layer) 421.
 6. Determine if $z^{[l](i)}_{BN}$ is within the linear range of activation function, or with a quantization zone (e.g., between breakpoints) 422.
 7. A) If Yes: Then a previous activation scaling factor $g^l$(u=previous) is selected for use as $g^l$.
    B) If No: Then a new activation scaling factor $g^l$(u=new) is computed or selected from a PWL approximation of the activation function 423.
 8. Compute update to an expanded matrix $A^L$ using $g^l \Delta z^{[l](i)}_{BN}$ 424.
 10. Perform parameter update(s) 425, which can be based on total cost computed from $A^L$.

In some aspects, the term $$\frac{1}{\sqrt{\sigma^2 + \varepsilon}}$$

can be implemented as a scaling update to the linear model (as either a multiplicative or additive update, for example), and the term $$\frac{\mu}{\sqrt{\sigma^2 + \varepsilon}}$$

can be implemented in an update to the linear model.

At test time, $\mu$ and $\sigma^2$ can be computed using exponentially weighted averages across mini-batches. For example, $\mu^{\{1\}}$ can be computed for first mini-batch, ..., and $\mu^{\{m\}}$ computed for $m^{th}$ mini-batch, and the running average can be computed. This process can also be performed for $\sigma^2$, and the exponentially weighted averages of $\mu$ and $\sigma^2$ can be used to compute $z^{[l](i)}_{norm}$. Similarly, some aspects can compute exponentially weighted averages across mini-batches for the activation scaling factors $g^l$. In some aspects, updates to $z_{norm}^{(i)}$ (such as computed from mean and variance) can be incorporated into updates to $\beta^{[l]}$ and/or $\gamma^{[l]}$. The updates to $\beta^{[l]}$ can be implemented as corresponding updates to the activation scaling factor $g^{[l]}$ employed in a linear update model. Some aspects can normalize $z^{[l]}$ (e.g., before activation function), and some aspects can normalize $a^{[l]}$ after activation.

At a given layer l, an exemplary aspect computes the change ($\delta\beta^{[l]}$) in the loss or cost function with respect to $\beta^{[l]}$, and/or computes ($\delta\gamma^{[l]}$) in the loss or cost function with respect to $\gamma^{[l]}$, and then computes an updated $\beta^{[l]}$: $\beta=\beta^{[l]}-\alpha\delta\beta^{[l]}$ and/or $\gamma^{[l]}$: $\gamma=\gamma^{[l]}-\alpha\delta\gamma^{[l]}$, where $\alpha$ is the learning-rate hyperparameter, using gradient descent, adam, RMSprop, momentum, or some other technique, to update the parameters $\beta^{[l]}$ and $\gamma^{[l]}$, which both have dimension $(n^{[l]}, 1)$.

Figure 4D:
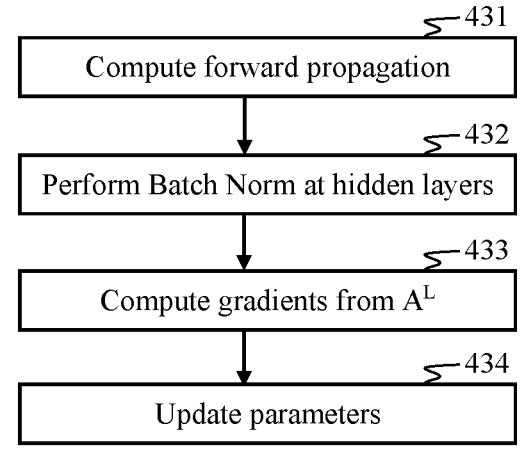

It should be appreciated that some implementations can be employed via the following steps as shown in FIG. 4D:
1. For $t=1, \ldots$, number of mini-batches; compute the forward propagation based on input X 431.
2. In each hidden layer, batch-norm might be employed 432 to replace $zu^{[l]}$ with $z^{[l]}_{BN}$, (e.g., normalize to mean zero and variance 1) which have normalized mean and variance.
3. Then employ methods disclosed herein to compute gradients of parameters 433 (or derivatives of the output, error, cost, loss, etc. with respect to the parameters), e.g., $\delta w^{[l]}$, $\delta\beta^{[l]}$, $\delta\gamma^{[l]}$. This can comprise configuring an expanded matrix with elements (e.g., columns) that are multipliers of the parameters, e.g., $w^{[l]}$, $\beta^{[l]}$, $\gamma^{[l]}$. These elements can be numerically computed, and used to compute the gradients 433.
4. Updates to the parameters can be computed 434, such as via gradient descent, RMSprop, momentum, adam, or some other parameter update algorithm.

Batch-norm makes weights at later layers more robust to changes in earlier layers. It reduces the amount that hidden-layer values $a^{[l]}$ change due to updates in earlier layers by ensuring that the z values have the same mean and variance. It effectively weakens the coupling between layers. This makes the model more linear for purposes of approximation, and can reduce the number of instances that a parameter update at layer l results in nonlinear behavior in an activation function at a later layer. This reduces the number of activation updates to the model due to later layers.

The following process can be implemented for each of the later layers, for a given parameter update at an earlier layer. For each mini-batch (e.g., mini-batch $\{1\}$), compute $z^{[l]}$ or $\Delta z^{[l]}$ from inputs $a^{[l-1]}$ and weights $w^{[l]}$, ($z^{[l]}=w^{[l]}a^{[l-1]}$), compute the mean and variance for the mini-batch of the $z^{[l]}$ values, perform batch-norm on the $z^{[l]}$ values (e.g., compute the normalized $z^{[l]}$, and compute $z^{[l]}_{BN}=\gamma^{[l]}z^{[l]}+\beta^{[l]}$), then determine if the corresponding activation scaling function $g^{[l]}$ needs to be updated (such as by determining if the $z^{[l]}_{BN}$ value is still within the same quantization region as the previous z value). Note that $b^{[l]}$ can be omitted, since batch-norm zeros subtracts the mean of the $z^{[l]}$ values, so any constant added to $z^{[l]}$ is cancelled out. Update $g^{[l]}$ where necessary. Include the effects of the corresponding updated $a^{[l]}$ in later layer(s). This process can be repeated for other mini-batches.

In the case of covariate shift, there might be an initial X to Y mapping, but the distribution of X may change at a later time, which can necessitate retraining the learning algorithm.

A loss function, such as $L(\hat{y},y)=\frac{1}{2}(\hat{y}-y)^2$, can be computed for each training example in each of the m training sets. A cost function (or total cost) $J(w, b)$ applies to the entire training, and can be computed 115 as an average of the loss functions:

$$J(w, b) = \frac{1}{m}\sum_{i=1}^{m} L(\hat{y}^{(i)}, y^{(i)})$$

A regularization term may be added to the cost function (e.g., L1 or L2 regularization), and is usually a function of the weights. The regularization affects the parameter updates (e.g., w), so L2 regularization effects weight decay in the updates.

The parameters (e.g., w, and b) can be updated 116 (i.e., modified) to minimize the total cost $J(w,b)$. For example, the updates can be expressed by:

$$w := w - \alpha\frac{\delta J(w, b)}{\delta w}, \quad b := b - \alpha\frac{\delta J(w, b)}{\delta b}$$

Where $\alpha$ denotes a learning rate. The partial derivatives can comprise an average of computed partial derivatives. Weight updates can include regularization.

Any of various optimization algorithms can be employed. Gradient descent can be employed with momentum. Exponentially weighted moving averages may be employed. For example, $$v_{dW} = \beta v_{dW} + (1-\beta)\frac{\delta J(w, b)}{dw}$$

$$v_{db} = \beta v_{db} + (1-\beta)\frac{\delta J(w, b)}{db}$$

$$w := w - \alpha v_{dW}, \quad b := b - \alpha v_{db}$$

Another aspect may employ RMSprop:

$$s_{dW} = \beta s_{dW} + (1-\beta)\frac{\delta J(w, b)^2}{dw}$$

$$s_{db} = \beta s_{db} + (1-\beta)\frac{\delta J(w, b)^2}{db}$$

$$w := w - \frac{\alpha\left(\frac{\delta J(w, b)}{\delta w}\right)}{\sqrt{s_{dW}+\xi}}, \quad b := b - \frac{\alpha\left(\frac{\delta J(w, b)}{\delta b}\right)}{\sqrt{s_{db}+\xi}}$$

Another aspect may employ the Adam (adaptive moment estimation) optimization algorithm. Another aspect may employ learning-rate decay, wherein learning steps get smaller as convergence is approached. Various learning-rate decay schemes may be used to change $\alpha$. Since smaller steps facilitate the use of linear approximations, the model may switch to linear approximations when a threshold step size is crossed.

Computational processing, such as for updating the linear model and running computations for multiple training examples, can employ vectorization in place of explicit "for loops" in code in order to speed up the processing.

Dropout can be performed, such as by setting activations of selected hidden units to zero. This may be employed as a regularization scheme. For example, weights or activation functions can be set to zero. This can involve zeroing elements in the expanded matrices or changing the dimension of the matrices.

In one aspect, a node is selected for dropout if its activation is in the linear range of the activation function. For example, if z is small, $g(z)=\tanh(z)$ is in its linear range. In this case, the node is said to be linear. The history of the node's activation function (e.g., relative to iterations, training examples, etc.) can be used to determine a likelihood that the activation function will remain substantially linear (e.g., within a threshold of linearity, such as may be determined based on the difference in the linear approximation relative to the activation function) for future iterations and/or training examples. Then the linear node may be removed (dropped out), or the linear node's bias or activation function may be updated to adjust the node's activation into a nonlinear range.

If all the nodes are linear (e.g., for small changes in the argument of the activation function, and for activation functions operating in their linear range), the entire network can be approximated with a linear model. In some aspects, an initial training stage can comprise employing a linear approximation of an ANN to achieve an initial set of parameters and/or hyperparameters, which provide a solution that may have more bias than desired. Then the initial set of parameters can be employed in a nonlinear implementation of the ANN.

Figure 6:
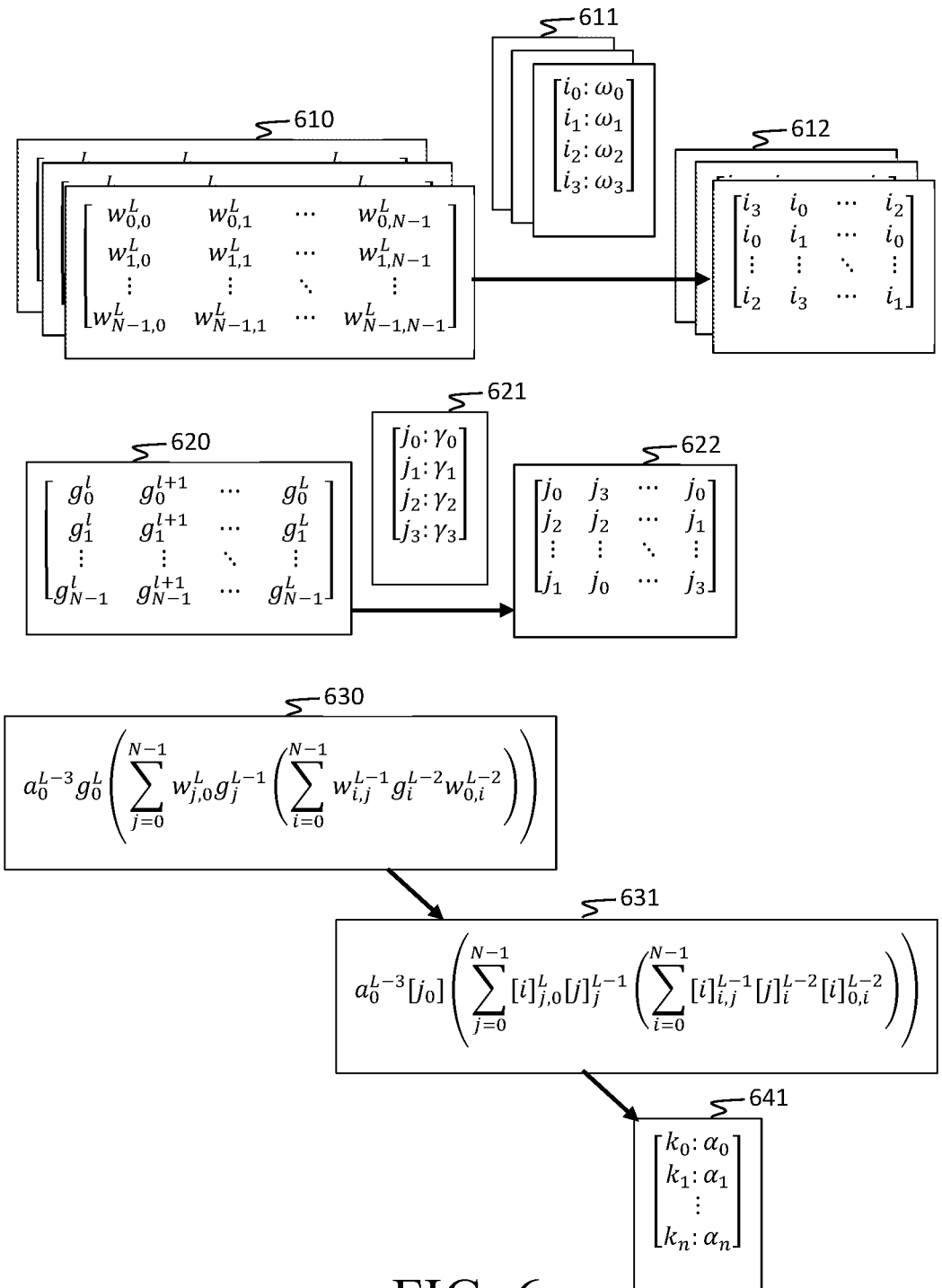
FIG. 6 illustrates data structures and a method whereby network quantization and weight sharing can compress an ANN by reducing the number of bits required to represent each weight.

FIG. 6 illustrates a method whereby network quantization and weight sharing can compress a network by reducing the number of bits required to represent each weight. In one aspect, the weights in each layer's N×N weight matrix 610 can be quantized to M bins. Thus, a table 611 of M 32-bit values representing shared weights, or centroids, can take the place of $N^2$ 32-bit values of individual weights. $N^2$ small indices (or pointers) 612 that point to the table 611 of M values are included. Centroid initialization can employ various initialization methods, such as linear initialization, which linearly spaces the centroids between the [min, max] of the original weights. This helps to maintain the large weights, as the large weights play a more important role than smaller ones. Since all the weights in the same bin share the same value, each weight in the N×N weight matrix 610 is replaced with a small index 612 into the table 611 of shared weights. During update, the gradients are computed, and gradients corresponding to each weight can be grouped according to the weight's index. All gradients corresponding to the same index can be summed to produce N sums, and each sum can be scaled by a learning rate, and may be quantized to a restricted set. The scaled and quantized gradients might be subtracted from their respective centroids to provide for fine-tuning of the centroid values in table 611. Aspects can use k-means clustering to identify the shared weights for each layer so that all the weights that fall into the same cluster will share the same weight. In some aspects, weights are not shared across layers. Huffman coding may be employed. A Huffman code is an optimal prefix code commonly used for lossless data compression. It uses variable-length codewords to encode source symbols. The table 611 can be derived from the occurrence probability for each symbol. More common symbols are represented with fewer bits.

As described above, limiting the number of effective weights that need to be stored can be achieved by having multiple connections share the same weight, and then fine-tune the shared weights in subsequent updates. Note that PWL approximation of the activation functions can be performed to achieve both quantization and value sharing. Activation scaling factors 620 can be quantized, with indexed values stored in table 621, and the activations in table 620 can be replaced with indices to corresponding values in table 621.

Formula 630 represents a linear update operation. The weights and activations in the formula 630 can be replaced with indices to corresponding values in tables 611 and 612 to provide the algorithm in 631. The algorithm 631 can be configured to skip multiplications and/or additions that involve small values. When a value is updated, the formula may be updated via appropriate substitution. A numerical computation of the formula 631 can be stored in table 641.

In some aspects, products and/or sums in the algorithm 631 may be stored in the table 641. The stored products and/or sums may be operated upon by an update mechanism to update their values according to updates to any of their terms. In some aspects, stored products and/or sums may be common to multiple formulas, so updates might be performed only once to provide updates to multiple formulas.

Fine tuning the shared weights can be performed via updates to expanded matrices. In some aspects, each formula (e.g., 631) might comprise one or more expanded matrices with respect to the values being updated. In some aspects, the updates can be constrained to a restricted set that simplifies update operations on numerically computed values in the expanded matrices. Some aspects can provide for employing the scaled and quantized gradients to operate on numerically computed values in an expanded matrix in order to compute an update expanded matrix, which can be summed with a previous expanded matrix to produce an updated expanded matrix.

As a result of weights and/or activations being zero, expanded matrices disclosed herein can be sparse. The sparse structure can be stored using compressed sparse row (CSR) or compressed sparse column (CSC) format, which requires 2a+n+1 numbers, where a is the number of non-zero elements and n is the number of rows or columns. To compress further, the index differences may be stored instead of the absolute positions. For each column $A_j$ of matrix A, we store a vector v that contains the non-zero values, and a second, equal-length vector q that encodes the number of zeros before the corresponding entry in v. The v and q of all columns are stored in one large pair of arrays with a pointer vector p' pointing to the beginning of the vector for each column. A final entry in p' points one beyond the last vector element. Storing the sparse matrix by columns in CSC format makes it easy to exploit sparsity. An update, for example, can simply multiply each non-zero value by all of the non-zero elements in its corresponding column. Some aspects can provide for distributing the matrix and parallelizing the matrix-vector computation by interleaving the rows of the matrix A over multiple processing elements (PEs). The interleaved CSC representation allows each PE to quickly find the non-zero values in each column to be multiplied.

Figure 7:
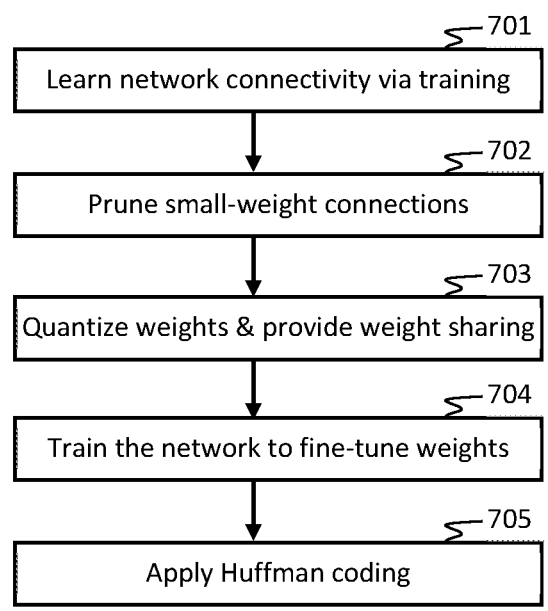
FIG. 7 is a flow diagram that illustrates a process according to some aspects of the disclosure. This process can reduce memory requirements, which might enable the model to be fit into on-chip SRAM cache rather than off-chip DRAM memory.

FIG. 7 is a flow diagram that illustrates a process according to some aspects of the disclosure. This process can reduce memory requirements, which might enable the model to be fit into on-chip SRAM cache rather than off-chip DRAM memory. This can facilitate the use of complex neural networks in mobile applications where application size and download bandwidth are constrained.

An initial training phase learns 701 the network connectivity and produces a first set of weights. Pruning 702 eliminates connections by setting weights that are below a small threshold value to zero. The remaining weights are quantized 703, followed by fine-tuning the quantized weights 704. Huffman coding may be applied 705. Aspects can employ an expanded-matrix ANN model.

In one aspect, the initial training phase 701 might update an expanded-matrix ANN model, wherein the elements in each expanded matrix comprise numerically computed values, and the updates operate on the values. The updates may be quantized to a restricted set in order to simplify the operations on the values. In another aspect, pruning 702 may be performed in an expanded-matrix ANN model, such as to skip multiplications and/or additions that involve values which pruning sets to zero. Pruning 702 may remove or otherwise update values in an expanded matrix. Quantization 703 can involve updates to an expanded matrix. In some aspects, numerical computation of values in each expanded matrix is performed following quantization 703, and then fine-tuning 704 may include updating each expanded matrix. The updates may be quantized to a restricted set in order to simplify the operations on the values.

Disclosed linear models can be used to compute gradients, including the gradient of the prediction output, error, or total loss with respect to a change in any of the ANN parameters. These models can be used to compute updates to any of the parameters. These models can be used to update the change to the prediction output, error, or total loss as a result of parameter updates. These models can be used to determine the effect of activating or deactivating particular nodes or synapses, such as for pruning or dropout. These models can update the prediction output, error, or total loss resulting from changing the ANN topology, such as by activating or deactivating particular nodes or synapses, skipping layers, and the like. These models can update the expanded matrix $A^L$, the prediction output, error, or total loss based on updates to the data input x. The effects of subsequent data inputs to the ANN can be modeled as updates to expanded matrices developed from previous data inputs. In some aspects, data inputs corresponding to different training examples can be grouped such that subsequent examples can employ the expanded matrices used in previous examples.

Once an updated expanded output matrix is computed, the elements in each row can be summed to generate the output vector. During training, the output vector can be compared to a vector of target values, and a cost function computed therefrom. A common objective is to compute the change in the cost function with respect to weights and biases throughout the ANN, which is typically performed by computing partial derivatives in a backpropagation and applying the chain rule. The cost function is computed from the activations of the final layer. Error in a given neuron is related to the rate of change in the cost function with respect to a change in the weight $$\left(\frac{\delta C}{\delta w_{jk}^l}\right),$$

and the rate or cnange in the cost function with respect to change in the bias $$\left(\frac{\delta C}{\delta b_j^l}\right).$$

One objective seeks to identify changes to the neuron's input that make the cost smaller. By discovering which weights and biases affect the cost the most, disclosed aspects can more efficiently train the network. In some aspects, parameter updates can be skipped for those parameters whose affect on the cost is below a threshold value.

In another approach, by inspecting the coefficients in each column of the expanded matrix, it can be rapidly determined which weights and biases have the greatest effect on the cost function and/or discard candidate weights and biases without requiring the full computation of the cost function. A similar approach may be performed to determine which neurons to eliminate from the network such that elimination of the selected node(s) have minimal or no effect on the network's accuracy.

The total error can be computed from the squared difference of each output value minus its corresponding target value, and these squared differences can be summed over all the outputs to produce the total error. In one example, the change in the total error for an update might be a function of the change in the $i^{th}$ column of the expanded output matrix. Thus, computing the magnitudes in the $i^{th}$ column in each row can provide a quick indication if the corresponding weight or bias is a good candidate to update for learning. This amount of change corresponding to each row may be divided by the sum of the rows elements, and the row with the highest value(s) may be determined, whereby the corresponding weight or bias might be selected for updating. A change in the magnitude may be used to determined subsequent updates for the corresponding parameter(s).

Figure 8A:
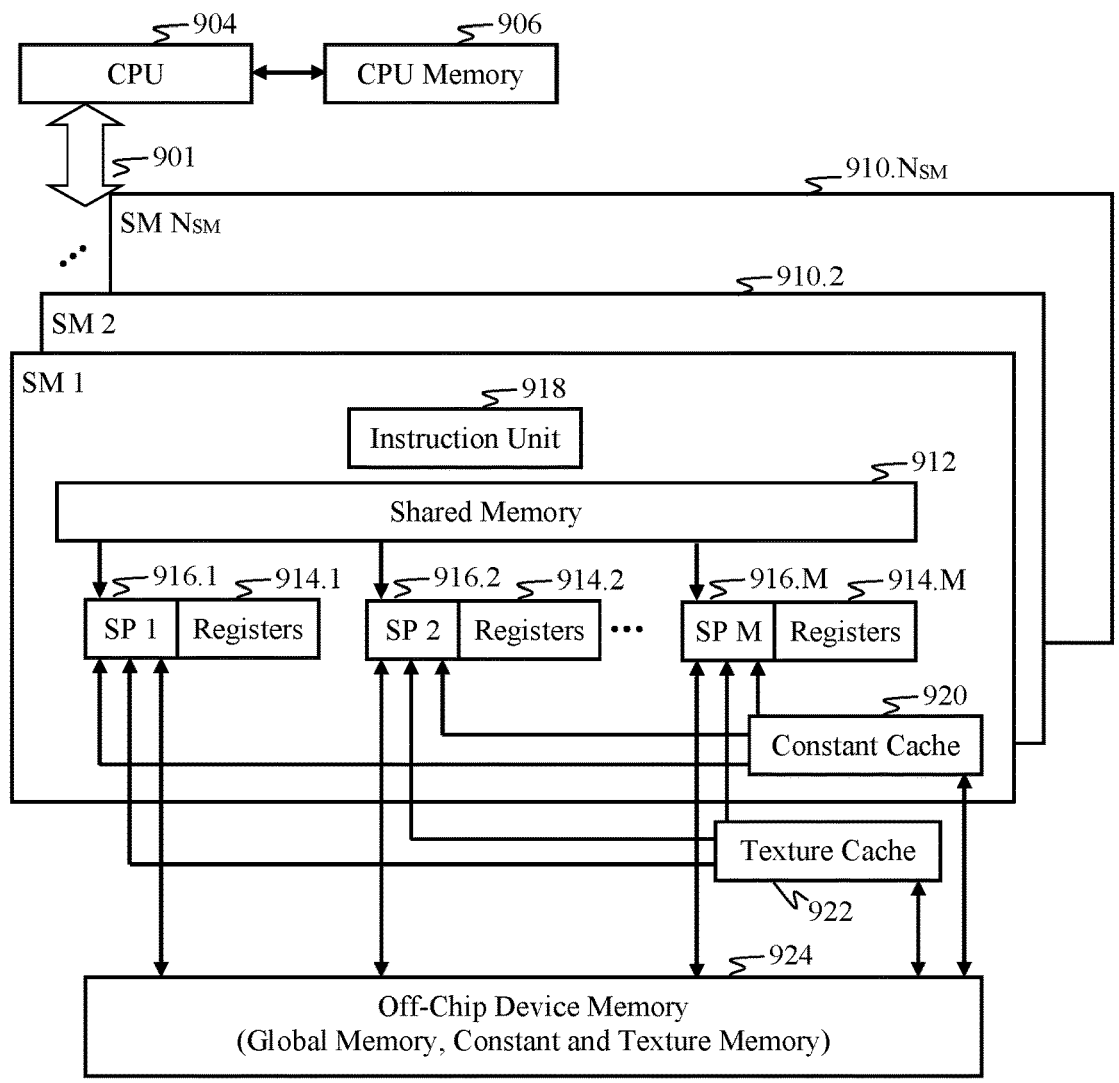
FIG. 8A illustrates a graphics processing unit (GPU) architecture that can be optimized for signal-processing functions disclosed herein.

FIG. 8A illustrates a graphics processing unit (GPU) architecture that can be optimized for signal-processing functions disclosed herein. The hardware and/or software can optimize expanded-matrix processing operations and partial updates, which include a variety of optimization solutions specific to sparse processing. The GPU architecture can be adapted for optimizing global memory access, optimizing shared memory access, and exploiting reuse and parallelism. Optimizing sparse processing operations can include characterizing memory access cost, access pattern, type and level of memory, and exploiting data locality. Exploiting reuse can include caching each element in on-chip memories, and exploiting parallelism can include employing synchronization-free parallelism.

Aspects disclosed herein can provide for optimizing dense and/or sparse operations (including sparse matrix-matrix multiplication, sparse transforms, and other operations that involve or are based upon diagonal expansion matrices and/or expanded discrete-time matrices) on graphics processing units (GPUs) using model-driven compile- and run-time strategies. By way of illustration, FIG. 8A depicts a GPU parallel computing architecture that includes Nsm levels of streaming multiprocessors (SMs) 910.1-910.N (SM 1, SM 2, ..., SM $N_{SM}$), each comprising a shared memory component 912, a level of M registers 914.1-914.M, a level of streaming processors (SPs) 916.1-916.M (SP 1, SP 2, ..., SP M), an instruction unit 918, a constant cache component 920, and a texture cache component 922. There are various memories available in GPUs, which can be organized in a hybrid cache and local-store hierarchy. The memories can include off-chip global memory, off-chip local memory, on-chip shared memory, off-chip constant memory with on-chip cache, off-chip texture memory with on-chip cache, and on-chip registers. An off-chip device memory component 924 can include global memory and/or constant and texture memory. The GPU architecture can include or be communicatively coupled 901 to a CPU 904 and a CPU memory 906, which may be adapted to store computer-readable instructions and data for performing the activity of the CPU 904. The CPU 904 may be in operative communication with components of the GPU architecture or similar components via a bus, a network, or some other communication coupling. The CPU 904 may effect initiation and scheduling of the processes or functions performed by the GPU architecture.

The shared memory 912 is present in each SM and can be organized into banks. Bank conflict can occur when multiple addresses belonging to the same bank are accessed at the same time. Each SM 910.1-910.N also has a set of registers 914.1-914.M. The constant and texture memories are read-only regions in the global memory space and they have on-chip read-only caches. Accessing constant cache 920 is faster, but it has only a single port and hence it is beneficial when multiple processor cores load the same value from the cache. Texture cache 924 has higher latency than constant cache 920, but it does not suffer greatly when memory read accesses are irregular, and it is also beneficial for accessing data with two-dimensional (2D) spatial locality.

The GPU computing architecture can employ a single instruction multiple threads (SIMT) model of execution. The threads in a kernel are executed in groups called warps, where a warp is a unit of execution. The scalar SPs within an SM share a single instruction unit and the threads of a warp are executed on the SPs. All the threads of a warp execute the same instruction and each warp has its own program counter. Each thread can access memories at different levels in the hierarchy, and the threads have a private local memory space and register space. The threads in a thread block can share a shared memory space, and the GPU dynamic random access memory (DRAM) is accessible by all threads in a kernel.

For memory-bound applications, such as matrix-matrix multiplication, it is advantageous to optimize memory performance, such as reducing the memory footprint and implementing processing strategies that better tolerate memory access latency. Many optimization strategies have been developed to handle the indirect and irregular memory accesses of sparse operations, such as sparse matrix vector multiplication (SpMV), for example. SpMV-specific optimizations depend heavily on the structural properties of the sparse matrix, and the problem is often formulated as one in which these properties are known only at run-time. However, in some aspects of the disclosure, sparse matrices have a well-defined structure that is known before run-time, and this structure can remain the same for many data sets. This simplifies the problem and thereby enables better-performing solutions. For example, weight update operations disclosed herein can be modeled as SpMV with a corresponding sparse operator matrix. If the structural properties of the sparse operator matrix are known before run-time, the hardware and software acceleration strategies can be more precisely defined.

The optimal memory access pattern is also dependent on the manner in which threads are mapped for computation and also on the number of threads involved in global memory access, as involving more threads can assist in hiding the global memory access latency. Consequently, thread mapping schemes can improve memory access. Memory optimization may be based on the CSR format, and the CSR storage format can be adapted to suit the GPU architecture.

Some aspects can exploit synchronization-free parallelism. In an SpMV computation, the parallelism available across rows enables a distribution of computations corresponding to a row or a set of rows to a thread block as opposed to allocating one thread to perform the computation corresponding to one row and a thread block to handle a set of rows. A useful access strategy for global memory is the hardware-optimized coalesced access pattern when consecutive threads of a half-warp access consecutive elements. For example, when all the words requested by the threads of a half-warp lie within the same memory segment, and if consecutive threads access consecutive words, then all the memory requests of the half-warp are coalesced into one memory transaction.

One strategy maps multiple threads per row such that consecutive threads access consecutive non-zero elements of the row in a cyclic fashion to compute partial products corresponding to the non-zero elements. The threads mapped to a row can compute the output vector element corresponding to the row from the partial products through parallel sum reduction. The partial products can be stored in shared memory, as they are accessed only by threads within a thread block.

Some techniques can exploit data locality and reuse. The input and output vectors can exhibit data reuse in SpMV computation. The reuse of output vector elements can be achieved by exploiting synchronization-free parallelism with optimized thread mapping, which ensures that partial contributions to each output vector element are computed only by a certain set of threads and the final value is written only once. The reuse pattern of input vector elements depends on the non-zero access pattern of the sparse matrix.

Exploiting data reuse of the input vector elements within a thread or among threads within a thread block can be achieved by caching the elements in on-chip memories. The on-chip memory may be, for example, texture (hardware) cache, registers, or shared memory (software) cache. Utilizing registers or shared memory to cache input vector elements can include identifying portions of a vector that are reused, which in turn, requires the identification of dense sub-blocks in the sparse matrix. For a predetermined set of sparse weight vectors, this information is already known. Preprocessing of the sparse matrix can be performed to extract dense sub-blocks, and a block storage format can be implemented that suits the GPU architecture (e.g., enables fine-grained thread-level parallelism). If the sequence length of the data symbols does not vary, then the sub-block size remains constant, which avoids the memory access penalty for reading block size and block index, as is typically required in SpMV optimizations.

Techniques described herein can include tuning configuration parameters, such as varying the number of threads per thread block used for execution and/or varying number of threads handling a row. To achieve high parallelism and to meet latency constraint, the SpMV can include multiple buffers. In one aspect, SpMV may include two sparse matrix buffers, two pointer buffers, and two output buffers. For example, two sparse matrix buffers are configured in alternate buffer mode for buffering sparse matrix coefficients, two pointer buffers are configured in alternate buffer mode for buffering pointers representing non-zero coefficient start positions in each column of the sparse matrix, while two output buffers are configured in alternate buffer mode to output the calculation result from one output buffer while the other output buffer is used to buffer the calculation result.

Figure 8B:
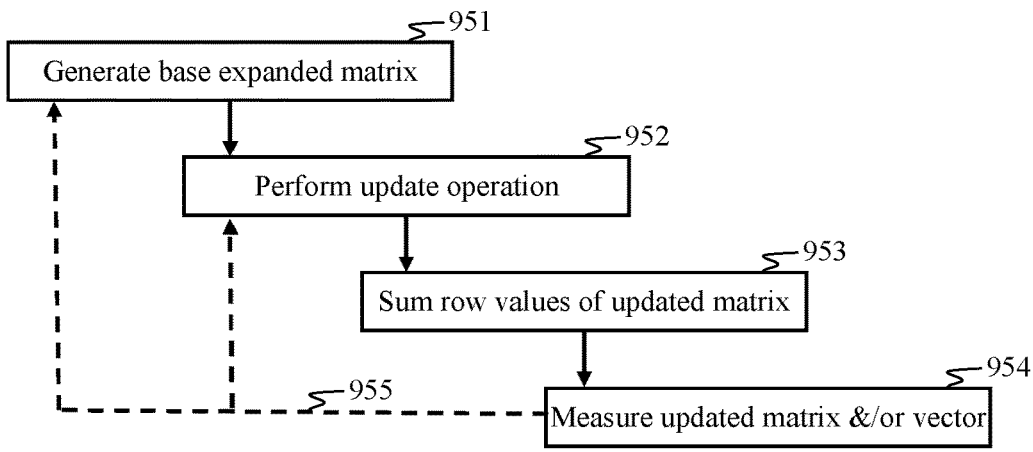
FIG. 8B is a flow diagram that is illustrative of a method, functional components of an apparatus, and code segments of a computer program in accordance with aspects of the disclosure.

FIG. 8B is a flow diagram that is illustrative of a method, functional components of an apparatus, and code segments of a computer program in accordance with aspects of the disclosure. Input data symbols and ANN parameter are processed for generating 951 a base expanded matrix at Layer L having a plurality of rows and a plurality of columns, wherein a sum of values in each row can produce a base signal vector, such as an ANN output vector (or Layer L activation). Values in at least one column of the base expanded matrix can be updated 952 to produce an updated expanded matrix. The values in each row of the updated expanded matrix can be summed 953 to produce an updated ANN output vector.

At least one feature of the updated expanded matrix and/or the updated ANN output vector may be measured 954. If only the updated expanded matrix is measured 954, then the diagram may flow directly from update 952 to measure 954. If an updated expanded matrix meets at least one measurement criterion in 954, the rows of the expanded matrix may be summed 953. In an aspect, the measurement in 954 is used, at least in part, to control the update operation 952. In an aspect, the measurement in 954 is used, at least in part, to assign at least one updated expanded matrix as a base expanded matrix in 951, which may be subsequently updated 952, such as in an iterative or recursive process.

Some aspects can be implemented in with dynamically generated filters. In an aspect, a filter-generating network produces filters conditioned on an input. The input can comprise the input data d to 951 and the filters can comprise the weight values of $w^{(u)}$ employed in 952. In an aspect, a dynamic filtering layer applies the generated filters to another input. The input can comprise the input data d to 951 and the filters can be applied in 951 and/or 952. The filter-generating network can be implemented with any differentiable architecture, such as a multilayer perceptron, recurrent neural network, or a convolutional network. Element 954 can function as a decision network, such as for selecting sample-specific features, learning new filters, and/or operating as a prediction network (e.g., a classifier).

In one aspect, FIG. 8B can generate filters given a sample-specific feature vector d. The filters can comprise base and/or update weight values $w^{(u)}$, which may be stored in a filter repository, and which are referred to as base filters. The process can be configured to learn a matrix that maps the feature vector d to a set of coefficients which will be used to linearly combine the base filters in the repository to generate new filters. This can constitute an additive update, for example. The set of coefficients can be implemented as an update weight matrix (in combination with the base filters), such as in the techniques disclosed herein. In another aspect, new filters may be generated directly from the feature vector d. In an aspect, the system learns sample-specific features to be used for filter generation.

In some aspects, filter sets can correspond to known physical properties of a data input signal, such as modulation, coding, spreading, spectral signature, bandwidth, CSI, SNR, duty cycle, frequency, time slot, amplitude, phase, direction of arrival, spatial signature, pulse shape, RF fingerprint, etc., and such properties can be used to train the network to represent these properties as a feature vector. However, there can be other properties of the input, and the system can learn the mapping in an unsupervised manner by employing the update techniques disclosed herein. In an aspect, the system learns sample-specific features for filter generation, extracts the features from the input data, maps a feature vector to a set of filters, and then employs a prediction network that takes in the same input data and the generated filters to make a prediction for high level tasks, such as detection, recognition, classification, etc.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, an FPGA, a CPU, a GPU, or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. An apparatus for an artificial neural network (ANN), comprising: one or more processors, coupled to a memory that includes instructions to execute operations of the one or more processors, configured to:
generate a base expanded matrix having a plurality of rows and a plurality of columns, the base expanded matrix representing an output of a layer of the ANN, wherein a sum of values in each row produces a base output vector of activations;
update values in at least one column of the base expanded matrix to produce an updated expanded matrix or an update expanded matrix; and
compute at least one of an error and a total cost from the updated expanded matrix or the update expanded matrix.

2. The apparatus of claim 1, wherein the base expanded matrix comprises parameters from one or more previous layers.

3. The apparatus of claim 1, wherein the at least one column is selected based on an update to a parameter in a previous layer of the ANN.

4. The apparatus of claim 1, wherein the updated expanded matrix is computed from at least one of an additive update or a multiplicative update to the base expanded matrix.

5. The apparatus of claim 1, wherein each column of the base expanded matrix comprises coefficients corresponding to one of a set of ANN parameters, or each column of the base expanded matrix comprises products of the coefficients with the one of the set of ANN parameters.

6. The apparatus of claim 1, wherein each value in the base expanded matrix is computed numerically, and the update expanded matrix or the updated expanded matrix is computed by constraining one or more update values to a restricted set of values such that updates to each value in the base expanded matrix can comprise only one or more of shifting the base expanded matrix value's bits, changing the base expanded matrix value's sign bit, deleting the base expanded matrix value, and changing the base expanded matrix value's decimal point.

7. The apparatus of claim 1, wherein the ANN comprises multiple electronic synapses connecting multiple electronic neurons.

8. The apparatus of claim 1, further comprising instructions to execute operations of the one or more processors to sum values in each row of the updated expanded matrix to produce an updated output vector.

9. A computer program product, comprising a non-transitory computer-readable memory having computer-readable program code stored thereon, the computer-readable program code containing instructions executable by one or more processors in an artificial neural network (ANN) to:
generate a base expanded matrix having a plurality of rows and a plurality of columns, the base expanded matrix representing an output of a layer of the ANN, wherein a sum of values in each row produces a base output vector of activations;
update values in at least one column of the base expanded matrix to produce an updated expanded matrix or an update expanded matrix; and
compute at least one of an error and a total cost from the updated expanded matrix or the update expanded matrix.

10. The computer program product of claim 9, wherein the base expanded matrix comprises parameters from one or more previous layers.

11. The computer program product of claim 9, wherein the at least one column is selected based on an update to a parameter in a previous layer of the ANN.

12. The computer program product of claim 9, wherein the updated expanded matrix is computed from at least one of an additive update or a multiplicative update to the base expanded matrix.

13. The computer program product of claim 9, wherein each column of the base expanded matrix comprises coefficients corresponding to one of a set of ANN parameters, or each column of the base expanded matrix comprises products of the coefficients with the one of the set of ANN parameters.

14. The computer program product of claim 9, wherein each value in the base expanded matrix is computed numerically, and the update expanded matrix or the updated expanded matrix is computed by constraining one or more update values to a restricted set of values such that updates to each value in the base expanded matrix can comprise only one or more of shifting the base expanded matrix value's bits, changing the base expanded matrix value's sign bit, deleting the base expanded matrix value, and changing the base expanded matrix value's decimal point.

15. The computer program product of claim 9, wherein the ANN comprises multiple electronic synapses connecting multiple electronic neurons.

16. The computer program product of claim 9, further comprising instructions executable by one or more processors to sum values in each row of the updated expanded matrix to produce an updated output vector.

17. A method for updating an artificial neural network (ANN), comprising:
generating a base expanded matrix having a plurality of rows and a plurality of columns, the base expanded matrix representing an output of a layer of the ANN, wherein a sum of values in each row produces a base output vector;
updating values in at least one column of the base expanded matrix to produce an updated expanded matrix or an update expanded matrix; and
computing at least one of an error and a total cost from the updated expanded matrix or the update expanded matrix.

18. The method of claim 17, wherein the base expanded matrix comprises parameters from one or more previous layers.

19. The method of claim 17, wherein the at least one column is selected based on an update to a parameter in a previous layer of the ANN.

20. The method of claim 17, wherein the updated expanded matrix is computed from a multiplicative update of the base expanded matrix or an additive update produced by summing the base expanded matrix with the update expanded matrix.

21. The method of claim 17, wherein each column of the base expanded matrix comprises coefficients corresponding to one of a set of ANN parameters, or each column of the base expanded matrix comprises products of the coefficients with the one of the set of ANN parameters.

22. The method of claim 17, wherein each value in the base expanded matrix is computed numerically, and the update expanded matrix or the updated expanded matrix is computed by constraining one or more update values to a restricted set of values such that updates to each value in the base expanded matrix can comprise only one or more of shifting the base expanded matrix value's bits, changing the base expanded matrix value's sign bit, deleting the base expanded matrix value, and changing the base expanded matrix value's decimal point.

23. The method of claim 17, wherein the ANN comprises multiple electronic synapses connecting multiple electronic neurons.

24. The method of claim 17, further comprising summing values in each row of the updated expanded matrix to produce an updated output vector.

\* \* \* \* \*